(12) United States Patent
Kudo

(10) Patent No.: US 11,030,162 B2
(45) Date of Patent: Jun. 8, 2021

(54) DISTRIBUTED PROCESSING MANAGEMENT METHOD AND DISTRIBUTED PROCESSING MANAGEMENT APPARATUS

(71) Applicant: FUJITSU LIMITED, Kawasaki (JP)

(72) Inventor: Shun Kudo, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 116 days.

(21) Appl. No.: 15/616,667

(22) Filed: Jun. 7, 2017

(65) Prior Publication Data

US 2018/0032544 A1 Feb. 1, 2018

(30) Foreign Application Priority Data

Jul. 28, 2016 (JP) .............................. JP2016-148417

(51) Int. Cl.
| | | |
|---|---|---|
| *G06F 16/18* | (2019.01) | |
| *G06F 16/182* | (2019.01) | |
| *G06F 16/11* | (2019.01) | |
| *G06F 16/16* | (2019.01) | |
| *H04L 29/08* | (2006.01) | |

(52) U.S. Cl.
CPC .......... *G06F 16/183* (2019.01); *G06F 16/116* (2019.01); *G06F 16/162* (2019.01); *G06F 16/182* (2019.01); *H04L 67/10* (2013.01)

(58) Field of Classification Search
USPC .......................................................... 707/827
See application file for complete search history.

(56) References Cited

U.S. PATENT DOCUMENTS

| 4,989,134 | A | * | 1/1991 | Shaw | ................. G06F 12/0269 |
| 7,330,808 | B1 | * | 2/2008 | Jorgensen | ........... G06F 17/5022 |
| | | | | | 703/14 |
| 2001/0021935 | A1 | * | 9/2001 | Mills | ..................... G06F 16/30 |
| | | | | | 715/234 |

(Continued)

FOREIGN PATENT DOCUMENTS

| JP | 2000-339145 | 12/2000 |
| JP | 2004-118789 | 4/2004 |

(Continued)

*Primary Examiner* — Tamara T Kyle
*Assistant Examiner* — Raheem Hoffler
(74) *Attorney, Agent, or Firm* — Fujitsu Patent Center

(57) ABSTRACT

A distributed processing management apparatus analyzes a source file, extracts a reference item name of a reference item that is referenced in processing, and then generates a deletion program describing a process of deleting, from each of plural records, data of a non-reference item having an item name other than the reference item name. Further, the distributed processing management apparatus generates an insertion program describing a process of inserting, in each of the records, dummy data in the position where the data of the non-reference item was located. Then, the distributed processing management apparatus causes plural servers to execute distributed parallel processing based on processing program. When transmitting records, the servers delete data from the records to be transmitted according to the deletion program, before the transmission. When records are received, the servers insert dummy data into the received records according to the insertion program.

7 Claims, 29 Drawing Sheets

(56) References Cited

U.S. PATENT DOCUMENTS

| | | | |
|---|---|---|---|
| 2002/0138504 A1* | 9/2002 | Yano | G06F 11/1464 |
| 2004/0064808 A1 | 4/2004 | Kira | |
| 2006/0271868 A1* | 11/2006 | Sullivan | G06F 40/197 |
| | | | 715/764 |
| 2014/0101213 A1 | 4/2014 | Ueda et al. | |
| 2014/0101544 A1* | 4/2014 | Albrecht | G06F 40/295 |
| | | | 715/273 |
| 2014/0289257 A1* | 9/2014 | Cain | H04N 21/2402 |
| | | | 707/741 |
| 2016/0034379 A1* | 2/2016 | Shah | G06F 16/254 |
| | | | 707/602 |

FOREIGN PATENT DOCUMENTS

| | | |
|---|---|---|
| JP | 2010-134487 | 6/2010 |
| JP | 2014-78085 | 5/2014 |

* cited by examiner

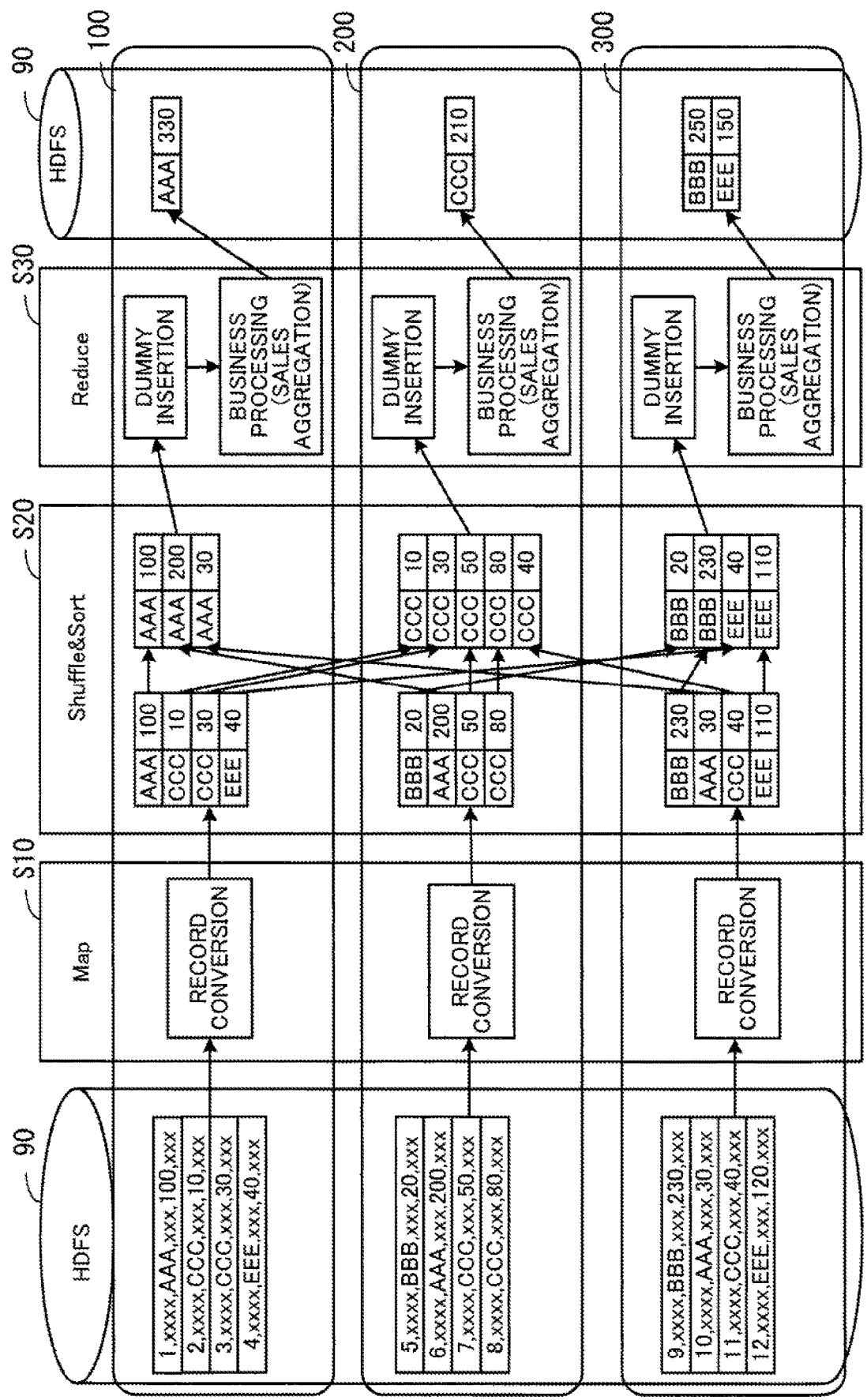

57 SOURCE FILE

```
// DATA READ SECTION
BufferedReader br = new BufferedReader(new FileReader("input.csv")); // Instruction1
HashMap<String, Integer> map = new HashMap<String, Integer>();
String line;
while((line = br.readLine()) != null) {      //Instruction2
    String[] row = line.split(",");           // Instruction3
    String key = row[2];                      // Instruction4
    int count = Integer.parseInt(row[4]);    // Instruction5
    if(map.containsKey(key)){
        count += map.get(key);
    }
    map.put(key, count);
}
```

FIG. 29

DISTRIBUTED PROCESSING MANAGEMENT METHOD AND DISTRIBUTED PROCESSING MANAGEMENT APPARATUS

CROSS-REFERENCE TO RELATED APPLICATION

This application is based upon and claims the benefit of priority of the prior Japanese Patent Application No. 2016-148417, filed on Jul. 28, 2016, the entire contents of which are incorporated herein by reference.

FIELD

The embodiments discussed herein are related to a distributed processing management method and a distributed processing management apparatus.

BACKGROUND

Large-scale computer systems handle a huge amount of data. Hadoop is one of the technologies that enable efficient distributed processing and management of such large data sets. Hadoop is an Open Source Software (OSS) framework for distributed processing of large data sets, and is mainly used for analytical processing. By applying Hadoop to batch processing of a mission-critical system, it is possible to perform large-scale batch processing at high speed. In the case of performing mission-critical batch processing in Hadoop, it is desired to output the same processing results as those obtained with conventional methods, without reconfiguring the user's existing resources.

As a useful technique for processing large data sets, there is a technique that reduces constraints on execution of an external program that processes multiple inputs on a distributed processing system, for example. There is also a technique that efficiently reduces the number of unused data items.

As a technique for effectively using user's existing resources, there is a technique that efficiently converts a program of a legacy system. There is also a technique that efficiently specifies an affected part for which an application program needs to be modified.

See, for example, Japanese Laid-open Patent Publications No. 2014-78085, No. 2004-118789, No. 2010-134487, and No. 2000-339145.

SUMMARY

According to one aspect of the invention, there is provided a distributed processing management method including: extracting, by a processor, a reference item name of a reference item that is referenced in processing from among a plurality of items of each of a plurality of records by analyzing a source file of a processing program describing the processing, the processing being performed on the plurality of records, the plurality of records being distributed and stored in a plurality of servers; generating, by the processor, a deletion program describing a process of deleting, from the records to be transmitted, data of a non-reference item that has an item name other than the reference item name; generating, by the processor, an insertion program describing a process of inserting, in each of the records with data of the non-reference item deleted therefrom, dummy data in a position where the data of the non-reference item was located; and causing, by the processor, the plurality of servers to execute the processing on the plurality of records in a distributed manner, based on the processing program, the causing including: before transmitting any of the plurality of records, causing the servers to delete data of the non-reference item from each of the records to be transmitted, according to the deletion program, and when the records with the data of the non-reference item deleted therefrom are received, causing the servers to insert dummy data in a position in each of the received records where the data of the non-reference item was located, based on the insertion program.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 28 illustrates an example of business processing for analyzing a CSV file; and FIG. 29 illustrates an example of a source file of a program that analyzes a CSV file.

DESCRIPTION OF EMBODIMENTS

Figure 1:
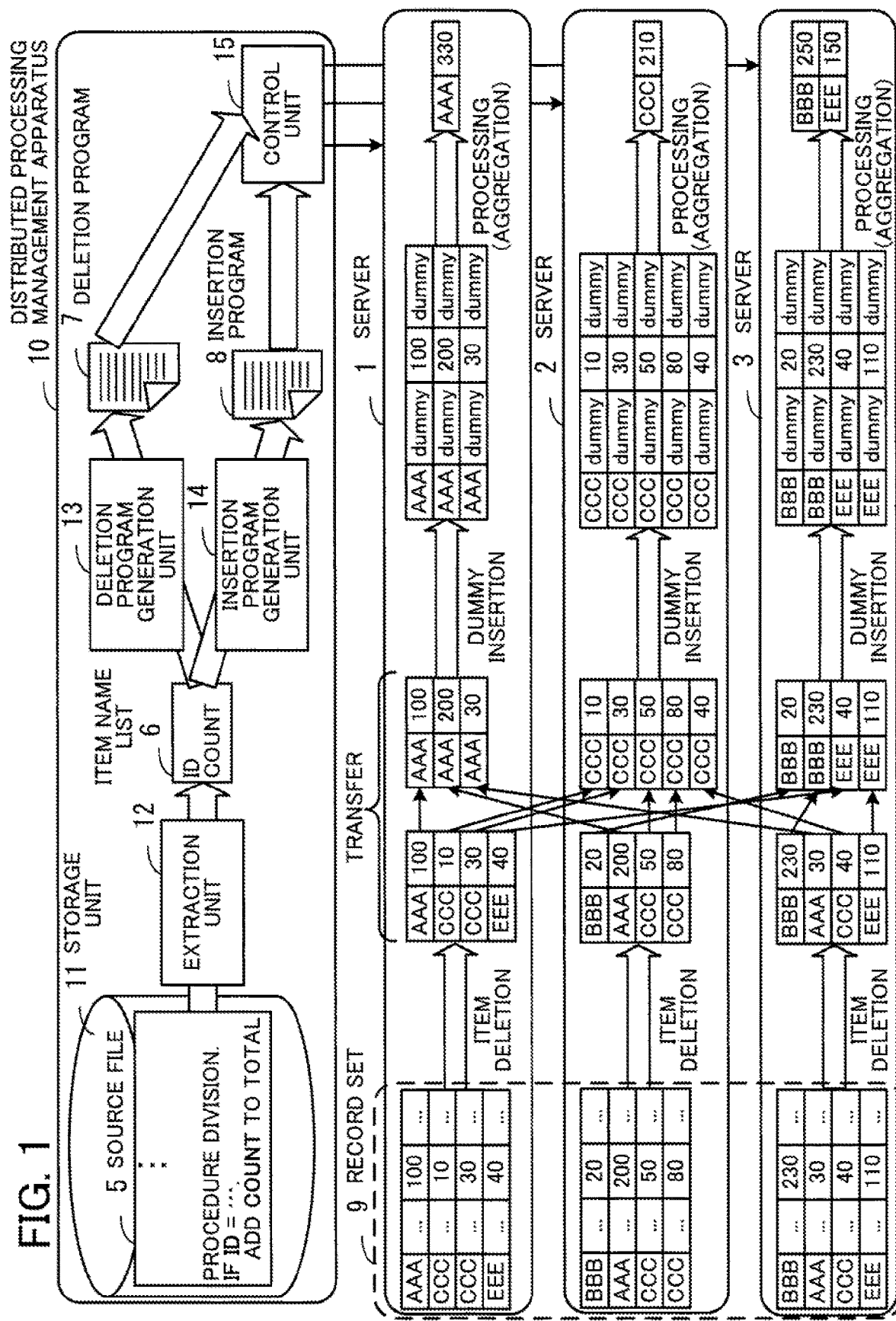
FIG. 1 illustrates an exemplary configuration of a distributed processing management apparatus according to a first embodiment.

The user's existing resources are not optimized for running Hadoop. Therefore, if the user's existing resources are implemented on the Hadoop framework without being reconfigured, it is not possible to achieve sufficient performance of Hadoop. For example, since Hadoop usually performs distributed processing using a plurality of machines, data is transferred between machines during the processing. However, the user's existing resources are not designed to transfer data between machines during processing. Therefore, if business processing using the existing resources is executed on the Hadoop framework, it is likely that a large amount of data is transferred. Consequently, the data transfer processing becomes a bottleneck that reduces the processing efficiency of the entire system.

When there is an item not referenced in business processing among a plurality of items in each record, data of such a non-reference item does not need to be transferred between machines. Accordingly, data of the non-reference item in the record may be deleted in a process before the transfer. However, in the business processing using the existing resources, if data of one or more items in the record is deleted before the transfer, the data structure of the record is changed, which results in failing to correctly perform business processing after the transfer.

Several embodiments will be described below with reference to the accompanying drawings, wherein like reference numerals refer to like elements throughout. Features of certain embodiments may be combined with features of other embodiments as long as no inconsistency arises.

(a) First Embodiment

Hereinafter, a first embodiment will be described.

FIG. 1 illustrates an exemplary configuration of a distributed processing management apparatus according to the first embodiment. A distributed processing management apparatus 10 includes a storage unit 11, an extraction unit 12, a deletion program generation unit 13, an insertion program generation unit 14, and a control unit 15.

The storage unit 11 stores a source file 5 of a processing program describing processing that is performed on a plurality of records (a record set 9) distributed and stored in a plurality of servers 1 to 3. Each record of the record set 9 includes a plurality of items. Each item is identified by the item name.

The processing program describes processing to be performed on the record set 9, on the premise that all the items of the record set 9 are present without being deleted. Accordingly, when an item in the record set 9 is deleted, it is likely that the processing based on the processing program is not correctly executed on the records of the record set 9.

The extraction unit 12 analyzes the source file 5, and extracts the item names (reference item names) of reference items that are referenced in the processing. For example, the extraction unit 12 generates an item name list 6 that lists the reference item names.

The deletion program generation unit 13 generates a deletion program 7. The deletion program 7 describes a process of deleting, from each of the plurality of records of the record set 9, data of a non-reference item that has an item name other than the reference item names.

The insertion program generation unit 14 generates an insertion program 8. The insertion program 8 describes a process of inserting, in each of the plurality records with the non-reference item deleted therefrom, dummy data in the position where the data of the non-reference item was located.

The control unit 15 causes the plurality of servers 1 to 3 to execute processing on the plurality of records of the record set 9 in a distributed manner, based on the processing program. In this step, in the case of transmitting any of the records of the record set 9, the control unit 15 causes the plurality of servers 1 to 3 to delete data from each of the records to be transmitted, according to the deletion program 7, before the transmission. Further, when data of a non-reference item is deleted, the control unit 15 causes the plurality of servers 1 to 3 to insert dummy data into each of the received records, according to the insertion program 8.

According to the distributed processing management apparatus 10 described above, among the items of each record of the record set 9 managed by the servers 1 to 3, the reference item name of a reference item that is referenced in the processing based on the processing program is listed on the item name list 6, based on the source file 5. Then, the deletion program 7 describing a process of deleting data of an item other than the reference item from each record and the insertion program describing a process of inserting dummy data for the deleted item into each record are generated. Then, the plurality of servers 1 to 3 execute processing on the records of the record set 9 based on the processing program in a distributed manner.

For example, each of the plurality of servers 1 to 3 deletes a non-reference item from the records stored therein, according to the deletion program 7. In the example of FIG. 1, items other than the item names "ID" and "COUNT" are deleted. Then, each of the plurality of servers 1 to 3 transfers each record to the server responsible for processing the record, using the value of the item with the item name "ID" in the record as a key, for example. In the example of FIG. 1, the records whose value of "ID" is "AAA" are transferred to the server 1; the records whose value of "ID" is "CCC" are transferred to the server 2; and the records whose value of "ID" is "BBB" and the records whose value of "ID" is "EEE" are transferred to the server 3.

Each of the plurality of servers 1 to 3 having received the records inserts dummy data at positions where deleted data was located. Then, each of the plurality of servers 1 to 3 executes processing on the records in which all the items are present due to insertion of dummy data, according to the processing program. In the example of FIG. 1, the counts are aggregated for each ID, and the sum is output.

In this manner, using the distributed processing management apparatus 10 makes it possible to delete data of non-reference items from the records to be transferred between the servers 1 to 3 in distributed processing, and reduce the data length of the non-reference items. Consequently, the data transfer efficiency is improved.

Further, since dummy data is inserted after the transfer, business processing is not affected. That is, the program that executes processing such as aggregation or the like describes the processing on the premise that all the items are present in the records of the record set 9. Therefore, if an item is deleted, the program might execute erroneous processing. In the example of FIG. 1, since the dummy data is inserted, all the items are present when executing processing such as aggregation. Therefore, it is possible to correctly perform processing without modifying the program.

There may be cases where the source file 5 includes a group item name indicating a group of plurality of items as the item name of a reference item. In such a case, the extraction unit 12 extracts the item names of the plurality of items as reference item names, for example. Thus, even if a reference item is specified by a group item name, it is possible to correctly extract the items to be referenced.

There may also be cases where the source file 5 includes an item name of an item to be referenced and a group item name indicating an item group to which the item belongs. In such a case, the extraction unit 12 extracts the reference item name with the group item name added thereto, from the source file 5, for example. Then, the deletion program generation unit 13 specifies, as a non-reference item, an item not belonging to the item group having the group item name, from among items having the reference item name. Then, the deletion program generation unit 13 generates the deletion program 7 describing a process of deleting data of the non-reference item. Thus, even if a plurality of items belonging to different item groups have the same item name, it is possible to distinguish the items from each other and correctly recognize a reference item. This prevents unneeded items from being included in the records to be transferred, and improves the efficiency of data transfer.

There may also be cases where the source file 5 includes an item name of an item to be referenced and a reference portion designation designating a portion of the item to be referenced. In such a case, the extraction unit extracts the item name with the reference portion designation added thereto as a reference item name, for example. The deletion program generation unit 13 adds, to the deletion program 7, a description of a process of deleting a non-reference portion that is not designated by the reference portion designation from the data of the item corresponding to the reference item name. The insertion program generation unit 14 adds, to the insertion program 8, a description of a process of inserting dummy data to the non-reference portion of the item corresponding to the reference item name. Thus, if an item is only partially referenced, the records may be transferred after deleting data of a portion that is not referenced. This prevents unneeded data from being included in the items of the records to be transferred, and improves the efficiency of data transfer.

There may also be cases where the source file 5 specifies a reference item from among a plurality of items that occur repeatedly with a reference item name, by specifying an occurrence number. In such a case, the extraction unit 12 extracts the reference item name with the occurrence number of the reference item added thereto, from the source file 5, for example. The deletion program generation unit 13 specifies, as a non-reference item, an item other than the item corresponding to the occurrence number from among the plurality of items corresponding to the reference item name, and generates the deletion program 7 describing a process of deleting the non-reference item. Thus, even when only some of a plurality of items that occur repeatedly with a reference item name are referenced, it is possible to transfer records after correctly deleting items that are not referenced. This prevents unneeded items from being included in the records to be transferred, and improves the efficiency of data transfer.

The extraction unit 12, the deletion program generation unit 13, the insertion program generation unit 14, and the control unit 15 may be implemented by, for example, a processor of the distributed processing management apparatus 10. The storage unit 11 may be implemented by, for example, a memory or a storage device of the distributed processing management apparatus 10.

Further, in the example of FIG. 1, the distributed processing management apparatus 10 is provided separately from the servers 1 to 3. However, one of the servers 1 to 3 may be configured to serve also as the distributed processing management apparatus 10.

(b) Second Embodiment

Next, a second embodiment will be described. The second embodiment is intended to improve the efficiency of data transfer in Hadoop.

Figure 2:
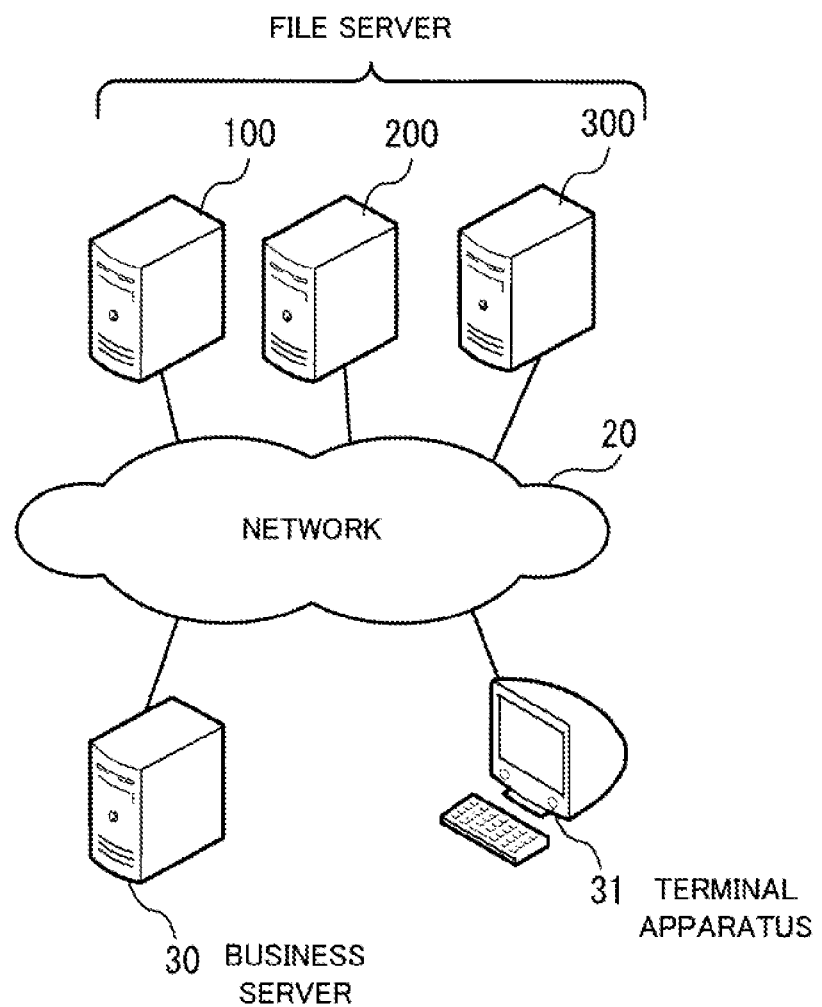
FIG. 2 illustrates an exemplary system configuration according to a second embodiment.

FIG. 2 illustrates an exemplary system configuration according to the second embodiment. A business server 30, a terminal apparatus 31, and a plurality of file servers 100, 200, and 300 are connected via a network 20. The business server 30 is a computer that processes information related to company business. The business server 30 stores information used for processing in the file servers 100, 200, and 300. The terminal apparatus 31 is a computer used by the user. The user uses the terminal apparatus 31 to instruct the business server 30 and the file servers 100, 200, and 300 to execute processing.

The file servers 100, 200, and 300 are computers included in Hadoop. The file servers 100, 200, and 300 process information using Hadoop. For example, the file servers 100, 200, and 300 aggregate the sales in batch processing.

Figure 3:
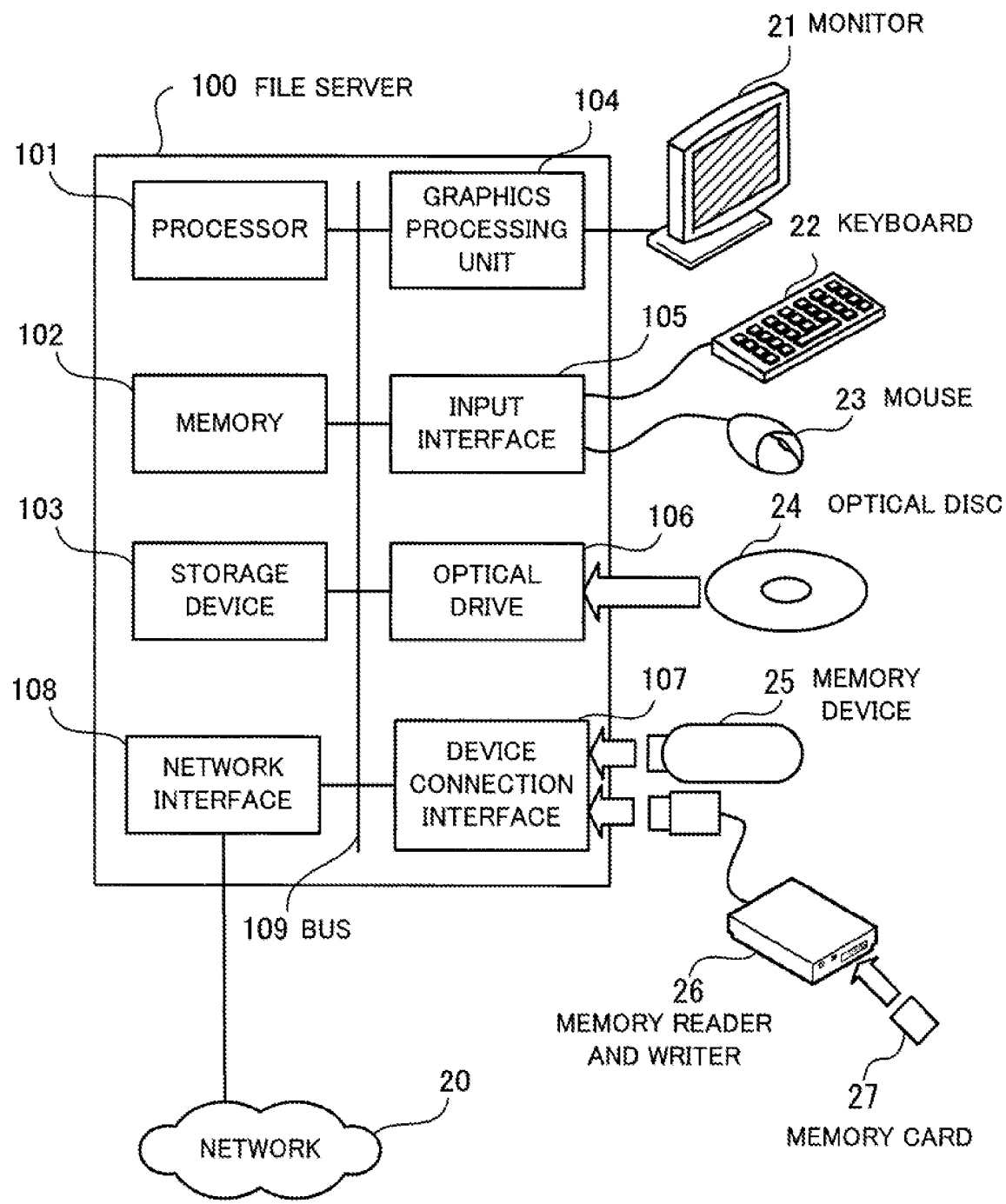
FIG. 3 illustrates an exemplary hardware configuration of a file server used in the second embodiment.

FIG. 3 illustrates an exemplary hardware configuration of a file server used in the second embodiment. A processor 101 controls the entire operation of the file server 100. A memory 102 and a plurality of peripheral devices are connected to the processor 101 via a bus 109. The processor 101 may be a multiprocessor. Examples of the processor 101 include a central processing unit (CPU), a micro processing unit (MPU), and a digital signal processor (DSP). At least a part of functions provided by a program executed by the processor 101 may be implemented by using electronic circuits such as an application-specific integrated circuit (ASIC), a programmable logic device (PLD), and the like.

The memory 102 is used as a primary storage device of the file server 100. The memory 102 temporarily stores at least part of the operating system (OS) program and application programs that are executed by the processor 101. The memory 102 also stores various types of data needed for the processing performed by the processor 101. Examples of the memory 102 include a volatile semiconductor storage device such as a random access memory (RAM) and the like.

The peripheral devices connected to the bus 109 include a storage device 103, a graphics processing unit 104, an input interface 105, an optical drive 106, a device connection interface 107, and a network interface 108.

The storage device 103 electrically or magnetically writes data to and reads data from its internal storage medium. The storage device 103 is used as a secondary storage device of the computer. The storage device 103 stores the OS program, application programs, and various types of data. The storage device 103 may be a hard disk drive (HDD) or a solid state drive (SSD), for example.

A monitor 21 is connected to the graphics processing unit 104. The graphics processing unit 104 displays an image on the screen of the monitor 21, in accordance with an instruction from the processor 101. Examples of the monitor 21 include a display device using a cathode ray tube (CRT), a liquid crystal display device, and the like.

A keyboard 22 and a mouse 23 are connected to the input interface 105. The input interface 105 receives signals from the keyboard 22 and the mouse 23, and transmits the received signals to the processor 101. The mouse 23 is an example of a pointing device, and other types of pointing devices may also be used. Examples of other types of pointing devices include a touch panel, a tablet, a touch pad, a track ball, and the like.

The optical drive 106 reads data from an optical disc 24 by using laser beams or the like. The optical disc 24 is a portable storage medium and stores data such that the data may be read through optical reflection. Examples of the optical disc 24 include digital versatile disc (DVD), DVD-RAM, compact disc read only memory (CD-ROM), CD-Recordable (CD-R), CD-Rewritable (CD-RW), and the like.

The device connection interface 107 is a communication interface that connects peripheral devices to the file server 100. For example, a memory device 25 and a memory reader and writer 26 may be connected to the device connection interface 107. The memory device 25 is a storage medium having a function to communicate with the device connection interface 107. The memory reader and writer 26 is a device that writes data to and reads data from a memory card 27. The memory card 27 is a card-type storage medium.

The network interface 108 is connected to the network 20. The network interface 108 exchanges data with other computers or communication apparatuses via the network 20.

With the hardware configuration described above, it is possible to provide the processing functions of the second embodiment. Note that the distributed processing management apparatus 10 of the first embodiment may also be implemented with the same hardware configuration as the file server 100 of FIG. 3.

The file server 100 implements the processing functions of the second embodiment by executing a program stored in a computer-readable storage medium, for example. The program describing the procedure to be performed by the file server 100 may be stored in various storage media. For example, the program to be executed by the file server 100 may be stored in the storage device 103. The processor 101 loads at least part of the program from the storage device 103 into the memory 102 so as to execute the program. The program to be executed by the file server 100 may also be stored in a portable storage medium, such as the optical disc 24, the memory device 25, the memory card 27, and the like. The program stored in the portable storage medium may be executed after being installed into the storage device 103 under the control of, for example, the processor 101. Further, the processor 101 may execute the program by reading the program directly from the portable storage medium.

The following describes a function that enables the plurality of file servers 100, 200, and 300 to efficiently execute information processing in cooperation with each other.

Figure 4:
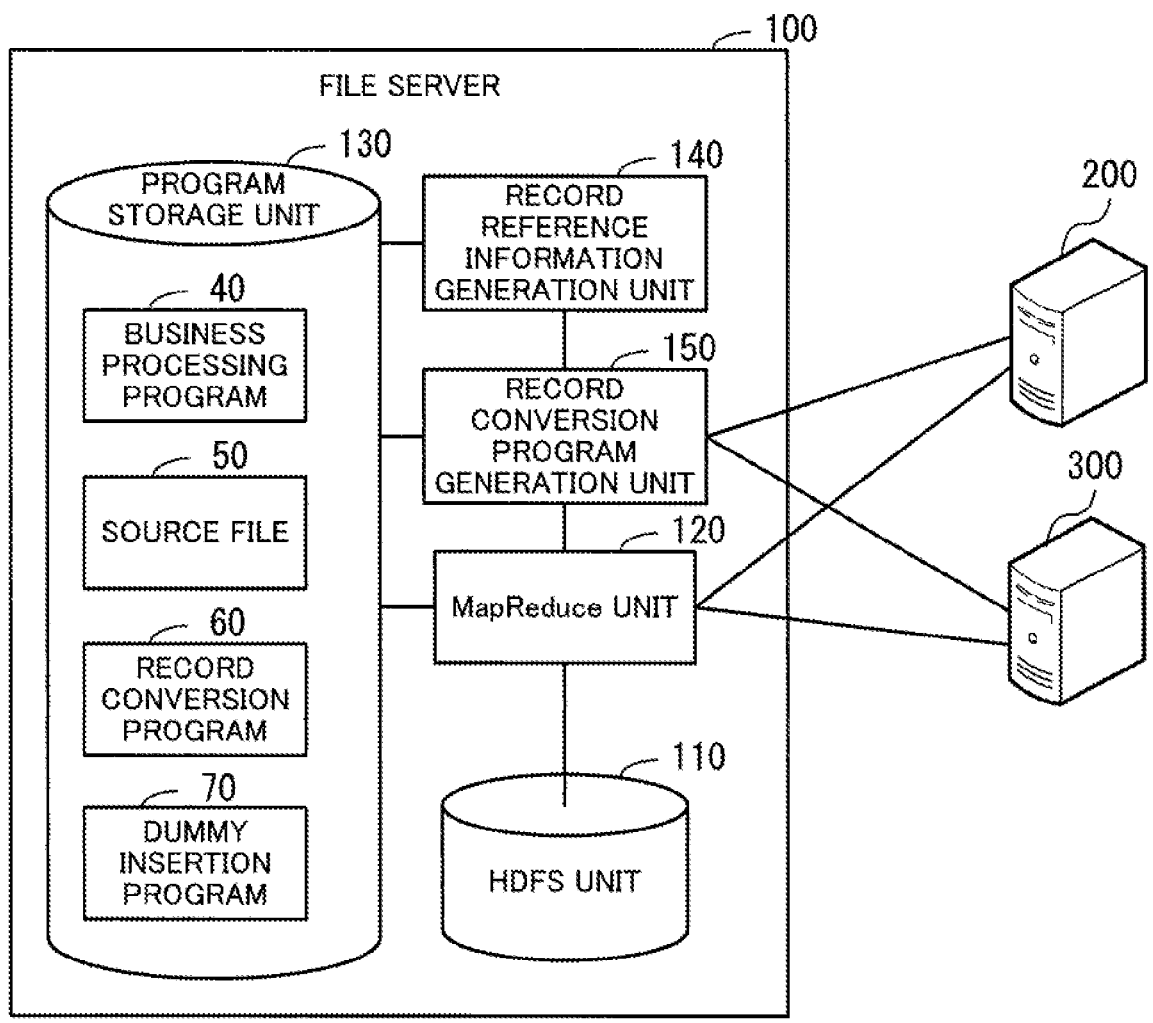
FIG. 4 is a block diagram illustrating examples of functions of the file server.

FIG. 4 is a block diagram illustrating examples of functions of a file server. The file server 100 includes a Hadoop Distributed File System (HDFS) unit 110, a MapReduce unit 120, a program storage unit 130, a record reference information generation unit 140, and a record conversion program generation unit 150.

The HDFS unit 110 stores information on the business. The HDFS unit 110 serves as a single file system (HDFS) in cooperation with HDFS units of the other file servers 200 and 300.

The MapReduce unit 120 performs processing on information managed by the HDFS. For example, the MapReduce unit 120 performs a Map process, a Shuffle & Sort process, and a Reduce process, in cooperation with MapReduce units of the other file servers 200 and 300. The Map process is a process of extracting specified records from the HDFS unit 110. In the Map process, some business processing may be performed on the extracted records. The Shuffle & Sort process is a process of dividing extracted records into a plurality of groups based on a specific key, and transmitting the records of each group to the file server responsible for processing that group. The Reduce process performs processing, such as aggregation of sales or the like, on the records transmitted by the Shuffle & Sort process, and stores the results in the HDFS unit 110.

The program storage unit 130 stores a program used for performing processing on information managed by the HDFS. For example, the program storage unit 130 stores a business processing program 40, a source file 50, a record conversion program 60, and a dummy insertion program 70. The business processing program 40 is a program describing the procedure of processing performed on information managed by the HDFS in a machine language. The source file 50 is an electronic file containing the source program. The source program is a program describing processing executed by the business processing program 40 in a high-level language. The source program is written in Common Business Oriented Language (COBOL) or Java (registered trademark). The business processing program 40 is generated by compiling the source program. The program storage unit 130 is an example of the storage unit 11 of FIG. 1.

The record conversion program 60 is a program describing the processing procedure for reducing the data amount of records to be transferred by the Shuffle & Sort process. The record conversion program 60 is generated by the record conversion program generation unit 150, based on the source file 50. The record conversion program 60 is an example of the deletion program generation unit 13 of FIG. 1.

The dummy insertion program 70 is a program describing the procedure of inserting dummy data into the records transferred by the Shuffle & Sort process. The dummy insertion program 70 is generated by the record conversion program generation unit 150, based on the source file 50. The dummy insertion program 70 is an example of the insertion program generation unit 14 of FIG. 1.

The record reference information generation unit 140 generates record reference information indicating an item value that is referenced in the business processing, among a plurality of item values in each record managed by the HDFS, based on the source file 50. The record reference information generation unit 140 transmits the generated record reference information to the record conversion program generation unit 150. The record reference information generation unit 140 is an example of the extraction unit 12 of FIG. 1.

The record conversion program generation unit 150 generates the record conversion program 60 and the dummy insertion program 70, based on the record reference information. The record conversion program generation unit 150 stores the generated record conversion program 60 and the dummy insertion program 70 in the program storage unit 130. Further, the record conversion program generation unit 150 transmits the generated record conversion program 60 and the dummy insertion program 70 to the other file servers 200 and 300 such that each program is executed by the file servers 200 and 300 upon executing business processing. The record conversion program generation unit 150 is an example of a function incorporating the deletion program generation unit 13, the insertion program generation unit 14, and the control unit 15 of FIG. 1.

Note that the lines connecting the elements in FIG. 4 represent some of communication paths.

Communication paths other than those of FIG. 4 may be provided. Further, the functions of each element illustrated in FIG. 4 may be provided by, for example, causing a computer to execute a program module corresponding to the element.

The file server 100 has the functions described above. The other file servers 200 and 300 also have the same functions as those of the file server 100. This makes it possible to efficiently perform data distributed processing using the plurality of file servers 100, 200, and 300. Note that the record reference information generation process and the record conversion program generation process may be performed by any one of the file servers before starting the business processing. Hereinafter, generation of record reference information and generation of a record conversion program will be described in detail. In the following description, the file server 100 performs the record reference information generation process and the record conversion program generation process.

Figure 5:
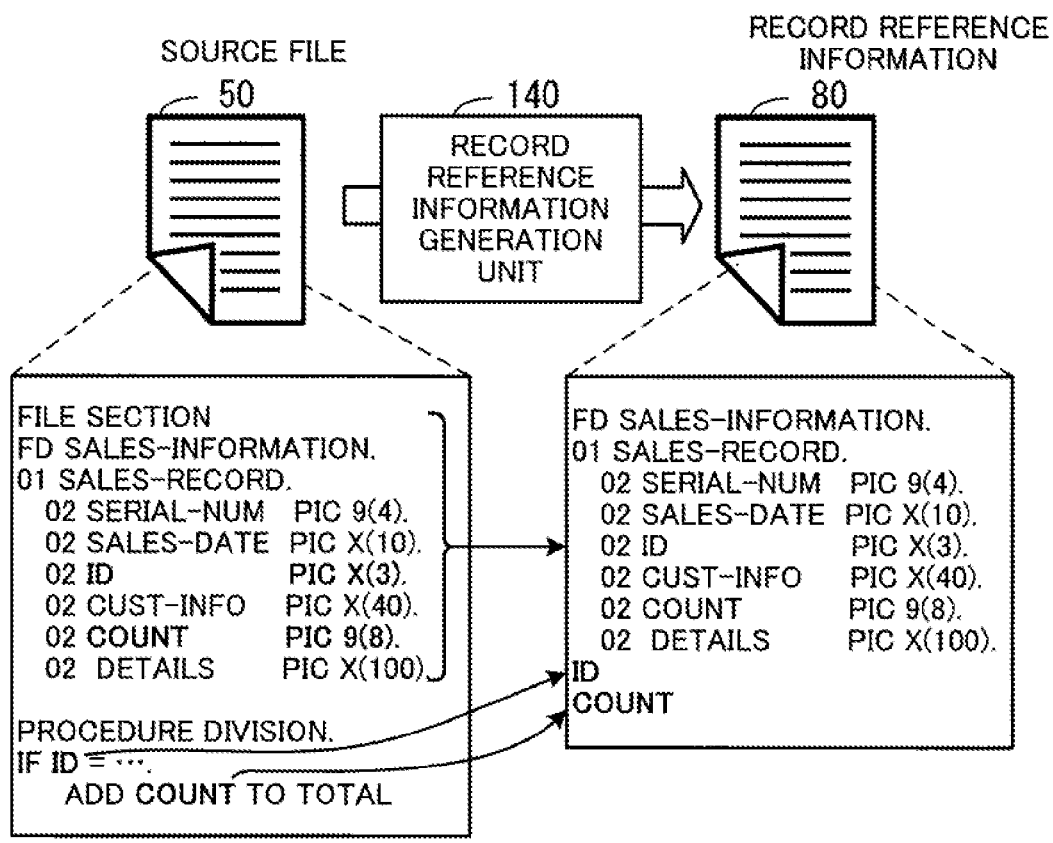
FIG. 5 illustrates an example of generating record reference information.

FIG. 5 illustrates an example of generating record reference information. The record reference information generation unit 140 obtains the source file 50. For example, the record reference information generation unit 140 receives an input specifying the source file name of the business processing, and reads the specified source file 50 from the program storage unit 130. The source file 50 includes "FILE SECTION" describing a record definition that is stored in the HDFS unit 110 to be used in the business processing. The record definition includes the item names (such as sequential number, sales date, and so on) of each record. The record reference information generation unit 140 obtains a record definition from "FILE SECTION", and copies the record definition to record reference information 80.

The source file 50 also includes "PROCEDURE DIVISION" describing processing that is performed on the records. The record reference information generation unit 140 analyzes the description of each line of "PROCEDURE DIVISION", and determines whether an item name indicated in the record definition is included. If an item name indicated in the record definition is included, the record reference information generation unit 140 adds that item name to the record reference information 80.

In the example of FIG. 5, "ID" in the description "IF ID= . . . " corresponds to an item name indicated in the record definition. Accordingly, "ID" is added to the record reference information 80. Similarly, "COUNT" in the description "ADD COUNT TO TOTAL" corresponds to an item name indicated in the record definition. Accordingly, "COUNT" is added to the record reference information 80. Note that COBOL reserved words, and the user defined items not included in the record definition, other than "ID" and "COUNT", are not added to the record reference information 80.

In this manner, the item names of records that are actually referenced by the source code described in the source file 50 are added to the record reference information 80. Thus, the record definition in the HDFS unit 110 used in the business processing and the item names of the records referenced in the business processing are included in the record reference information 80. The record conversion program 60 and the dummy insertion program 70 are generated based on this record reference information 80.

Figure 6:
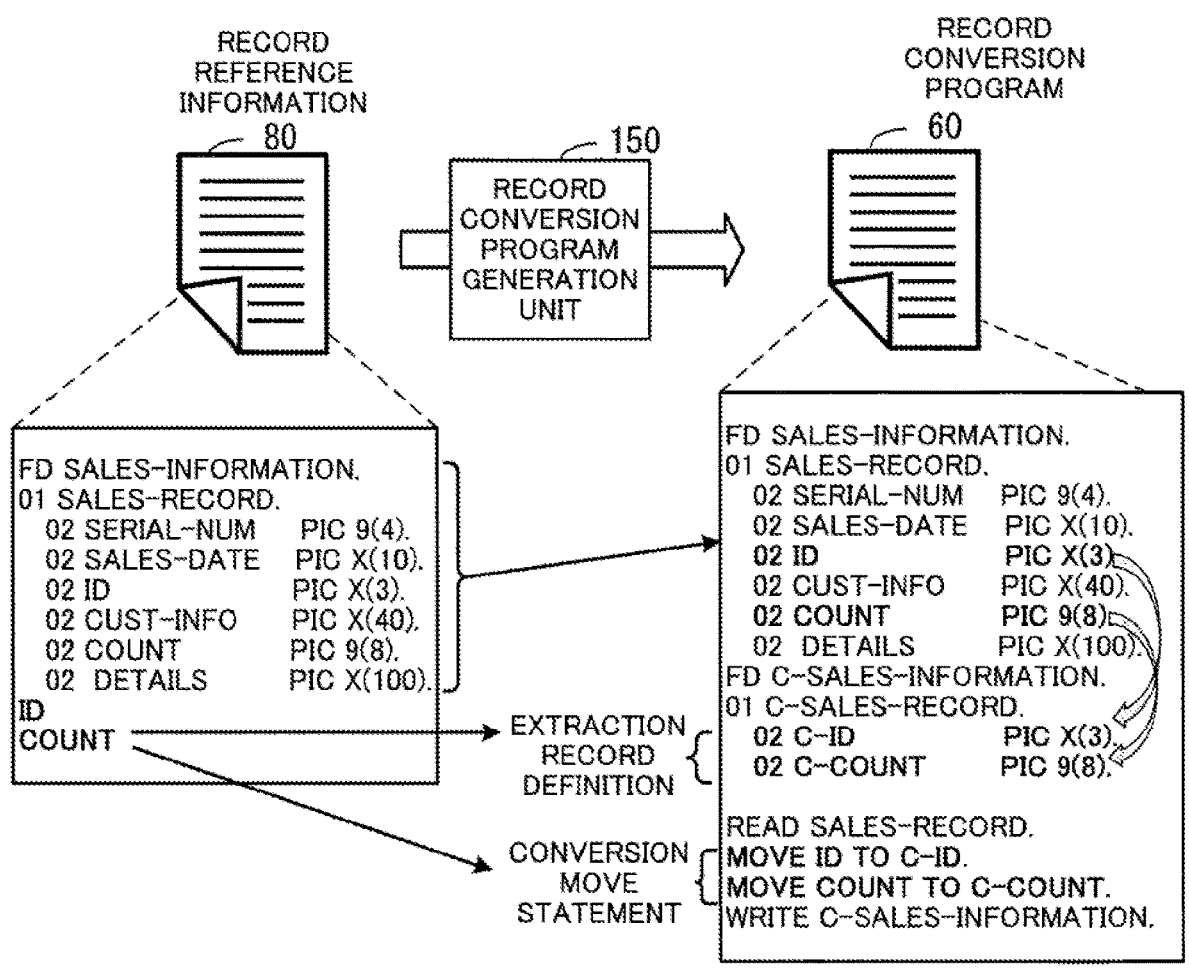
FIG. 6 illustrates an example of generating a record conversion program.

FIG. 6 illustrates an example of generating a record conversion program. The record conversion program generation unit 150 obtains the record reference information 80 from the record reference information generation unit 140.

The record conversion program generation unit 150 copies the record definition in the record reference information 80 to the record conversion program 60.

Then, the record conversion program generation unit 150 extracts each item name registered in the record reference information 80, and adds an extraction record definition corresponding to the extracted item name to the record conversion program 60. The attribute of the record definition including the extracted item name is copied to the attribute of the extraction record definition. Further, in the extraction record definition, the item name is converted into an item name with a string "C-" prefixed to the extracted item name (C-item name). For example, as for the item name "ID", an extraction record definition "02 C-ID PIC X(3)" is added to the record conversion program 60.

Further, the record conversion program generation unit 150 adds a READ statement "READ SALES-RECORD" that reads records in the HDFS to the record conversion program 60. Then, the record conversion program generation unit 150 adds conversion MOVE statements corresponding to the respective item names registered in the record reference information 80 to the record conversion program 60. The conversion MOVE statement is a statement that copies the value of a record indicated by an item name to a record indicated by a C-item name. The conversion MOVE statement is written in a format "MOVE item name TO C-item name". For example, as for the item name "ID", a conversion MOVE statement "MOVE ID TO C-ID" is added to the record conversion program 60.

Finally, the record conversion program generation unit 150 adds a WRITE statement "WRITE C-SALES-RECORD" that writes records to be transferred, to the record conversion program 60.

In this manner, the record conversion program 60 is generated. Upon generating the record conversion program 60, the record conversion program generation unit 150 generates the dummy insertion program 70 corresponding to the generated record conversion program 60.

Figure 7:
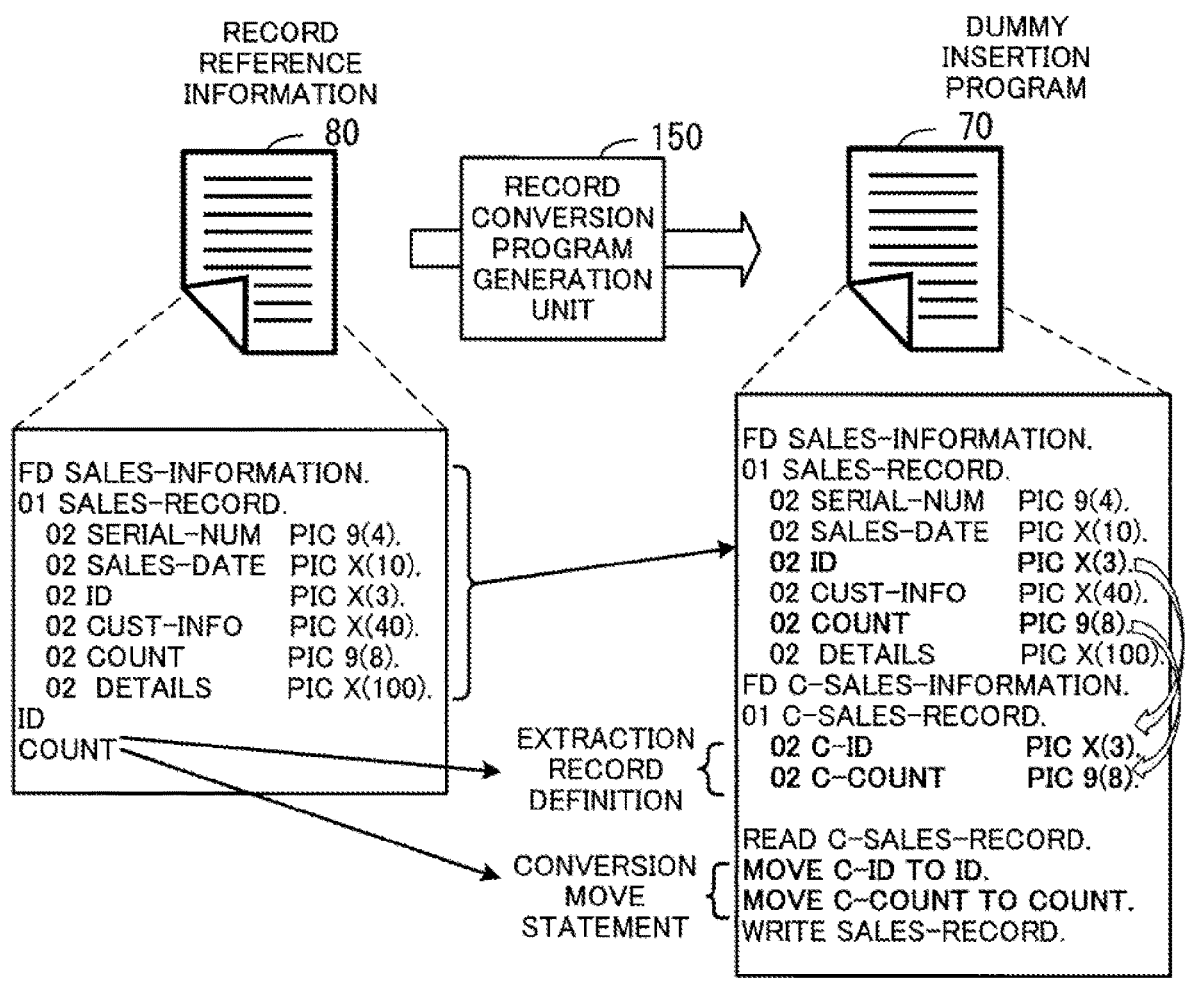
FIG. 7 illustrates an example of generating a dummy insertion program.

FIG. 7 illustrates an example of generating a dummy insertion program. The record conversion program generation unit 150 obtains the record reference information 80 from the record reference information generation unit 140.

The record conversion program generation unit 150 copies the record definition in the record reference information 80 to the dummy insertion program 70.

Then, the record conversion program generation unit 150 extracts each item name registered in the record reference information 80, and adds an extraction record definition corresponding to the extracted item name to the dummy insertion program 70. The attribute of the record definition including the extracted item name is copied to the attribute of the extraction record definition. Further, in the extraction record definition, the item name is converted into an item name with a string "C-" prefixed to the extracted item name (C-item name). For example, as for the item name "ID", an extraction record definition "02 C-ID PIC X(3)" is added to the dummy insertion program 70.

Further, the record conversion program generation unit 150 adds a READ statement "READ C-SALES-RECORD" that reads transferred records, to the dummy insertion program 70. Then, the record conversion program generation unit 150 adds conversion MOVE statements corresponding to the respective item names registered in the record reference information 80 to the dummy insertion program 70. The conversion MOVE statement is a statement that copies the value of a record indicated by a C-item name to a record indicated by an item name. The conversion MOVE statement is written in a format "MOVE C-item name TO item name". For example, as for the item name "ID", a conversion MOVE statement "MOVE C-ID TO ID" is added to the dummy insertion program 70.

Finally, the record conversion program generation unit 150 adds a WRITE statement "WRITE SALES-RECORD" that writes records to the HDFS to the dummy insertion program 70.

In this manner, the dummy insertion program 70 is generated. The record conversion program 60 and the dummy insertion program 70 differ from each other in the READ statement that reads records, the conversion MOVE statements, and the WRITE statement that writes records. The READ statement in the record conversion program 60 reads the records in the HDFS. Meanwhile, the READ statement in the dummy insertion program 70 reads the transferred records. The conversion MOVE statement in the record conversion program 60 is a statement that copies the values of the records in the HDFS to the records to be transferred. Meanwhile, the conversion MOVE statement in the dummy insertion program 70 is a statement that copies the values of the transferred records to the records in the HDFS. The WRITE statement in the record conversion program 60 writes the records to be transferred. Meanwhile, the WRITE statement in the dummy insertion program 70 writes the records in the HDFS.

The record conversion program 60 and the dummy insertion program 70 generated in the manner described above are stored in the program storage unit 130. Further, before performing business processing, the record conversion program 60 and the dummy insertion program 70 are distributed to the other file servers 200 and 300.

Figure 8:
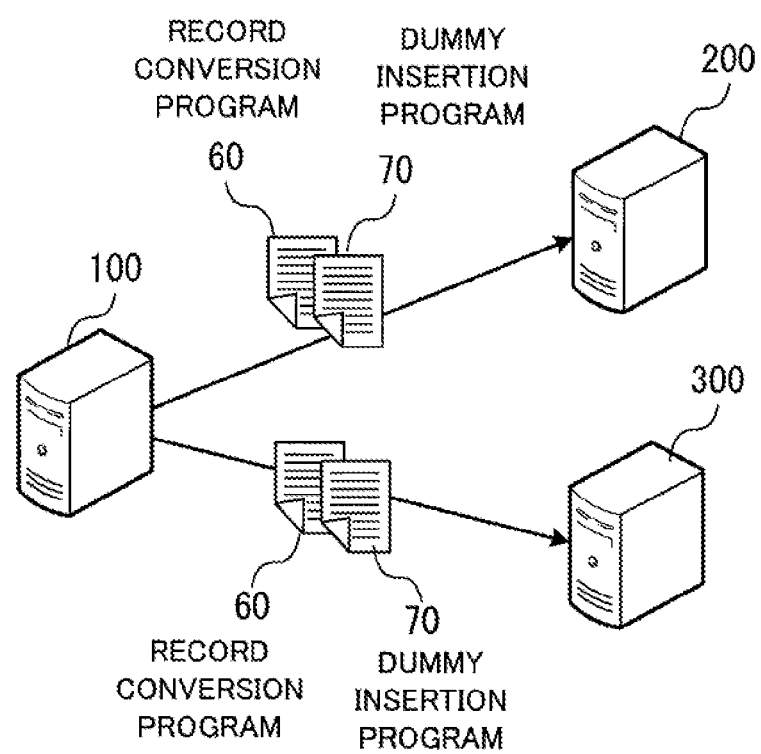
FIG. 8 illustrates distribution of a record conversion program and a dummy insertion program.

FIG. 8 illustrates distribution of a record conversion program and a dummy insertion program. As illustrated in FIG. 8, the file server 100 distributes the generated record conversion program 60 and the dummy insertion program 70 to the other file servers 200 and 300. Each of the file servers 200 and 300 stores the received record conversion program 60 and dummy insertion program 70 in its storage device, for example.

Thus, all the file servers 100, 200, and 300 in the file system have the record conversion program 60 and the dummy insertion program 70. Then, when all the file servers 100, 200, and 300 execute business processing in parallel in a distributed manner, a record conversion process based on the record conversion program 60 and a dummy insertion process based on the dummy insertion program 70 are performed. Note that the business processing is executed in batch processing at a predetermined time, for example.

Figure 9:
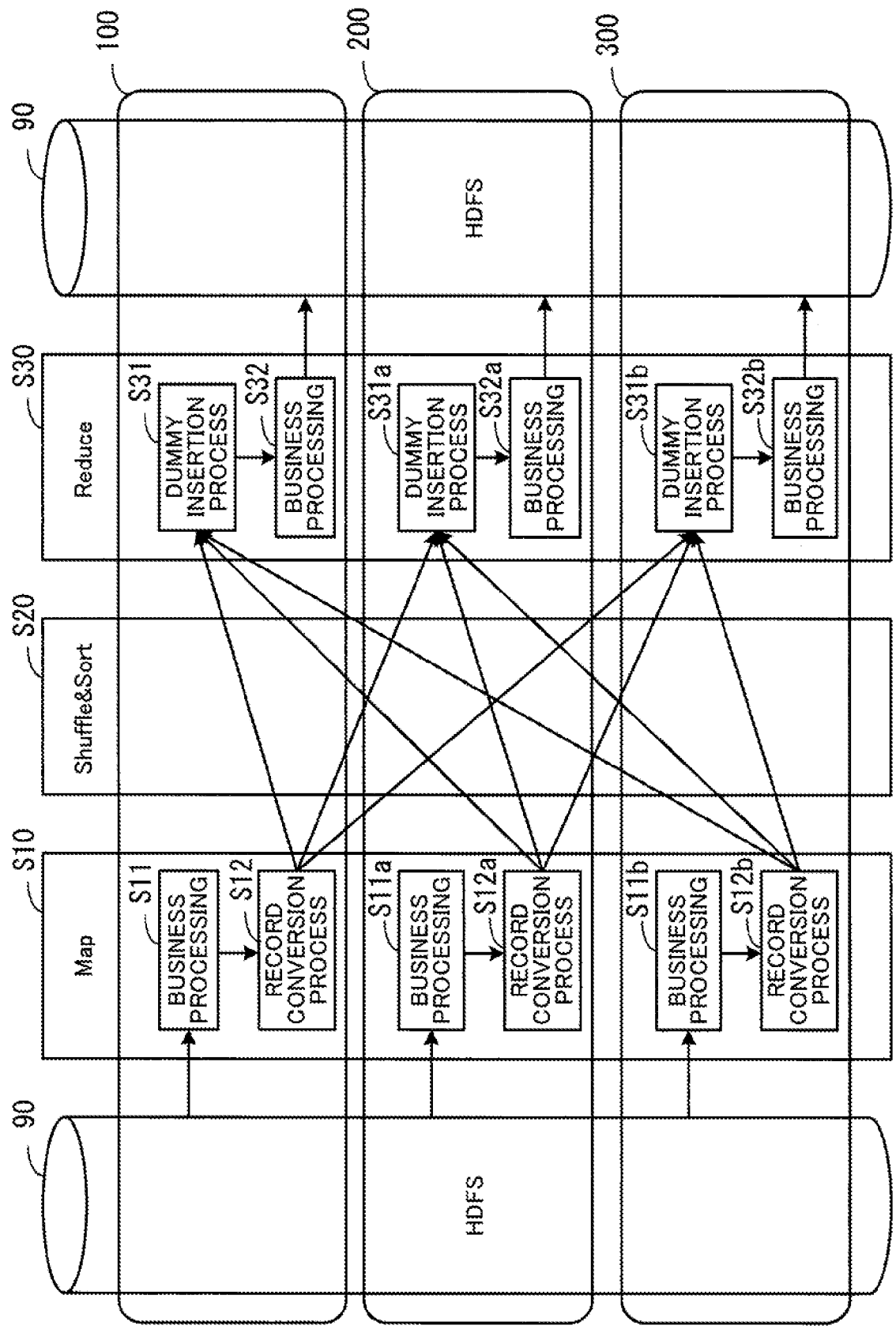
FIG. 9 illustrates an example of a processing flow in the case where a plurality of file servers perform business processing in cooperation with each other.

FIG. 9 illustrates an example of a processing flow in the case where a plurality of file servers perform business processing in cooperation with each other. When performing business processing based on the business processing program 40, each of the file servers 100, 200, and 300 first reads records from an HDFS 90 by performing a Map process (step S10). The records to be read are those corresponding to the record definition indicated in the business processing program 40. Note that each of the file servers 100, 200, and 300 reads the records managed therein, among the records in the HDFS 90, by performing a Map process.

In the Map process, business processing (steps S11, S11a, and S11b) and a record conversion process (steps S12, S12a, and S12b) are performed. For example, in the file server 100, the MapReduce unit 120 performs business processing (step S11) that precedes a Shuffle & Sort process, in accordance with the business processing program 40. The business processing performed in this step includes processing of records and an extraction process. Then, upon completion of the business processing, the MapReduce unit 120 performs a record conversion process (step S12), in accordance with the record conversion program 60. In the record conversion process, records containing only the item indicated by the extraction record definition are extracted as records to be transferred, from among all the records that are read from the HDFS 90 by the business processing. Note that the business processing may be omitted. In the case where the business processing is omitted, in the record conversion process, records containing only the item indicated by the extraction record definition are extracted as records to be transferred, from among all the records in the HDFS 90.

When the Map process ends, each of the file servers 100, 200, and 300 performs a Shuffle & Sort process (step S20). In the Shuffle & Sort process, a determination is made as to which file server processes which of the records to be transferred, based on a predetermined key. Then, each record is transmitted to the file server assigned to process the record.

After the Shuffle & Sort process, each of the file servers 100, 200, and 300 performs a Reduce process (step S30). In the Reduce process, a dummy insertion process (steps S31, S31a, and S31b) and business processing (steps S32, S32a, and S32b) are performed. For example, in the file server 100, the MapReduce unit 120 inserts dummy data to the received records, in accordance with the dummy insertion program 70 (step S31). The dummy data is inserted in the positions of the items deleted by the record conversion process. Then, the MapReduce unit 120 performs business processing (step S32) that follows the Shuffle & Sort process, in accordance with the business processing program 40. The business processing performed in the Reduce process is, for example, aggregation of the values of the records grouped by a predetermined key. Then, the MapReduce unit 120 stores the result of the business processing in the HDFS unit 110. As each of the file servers 100, 200, and 300 performs the Reduce process, the business processing result is stored in the HDFS 90.

Hereinafter, an improvement of the communication efficiency during distributed processing will be described with a specific example, with reference to FIGS. 10 and 11.

Figure 10:
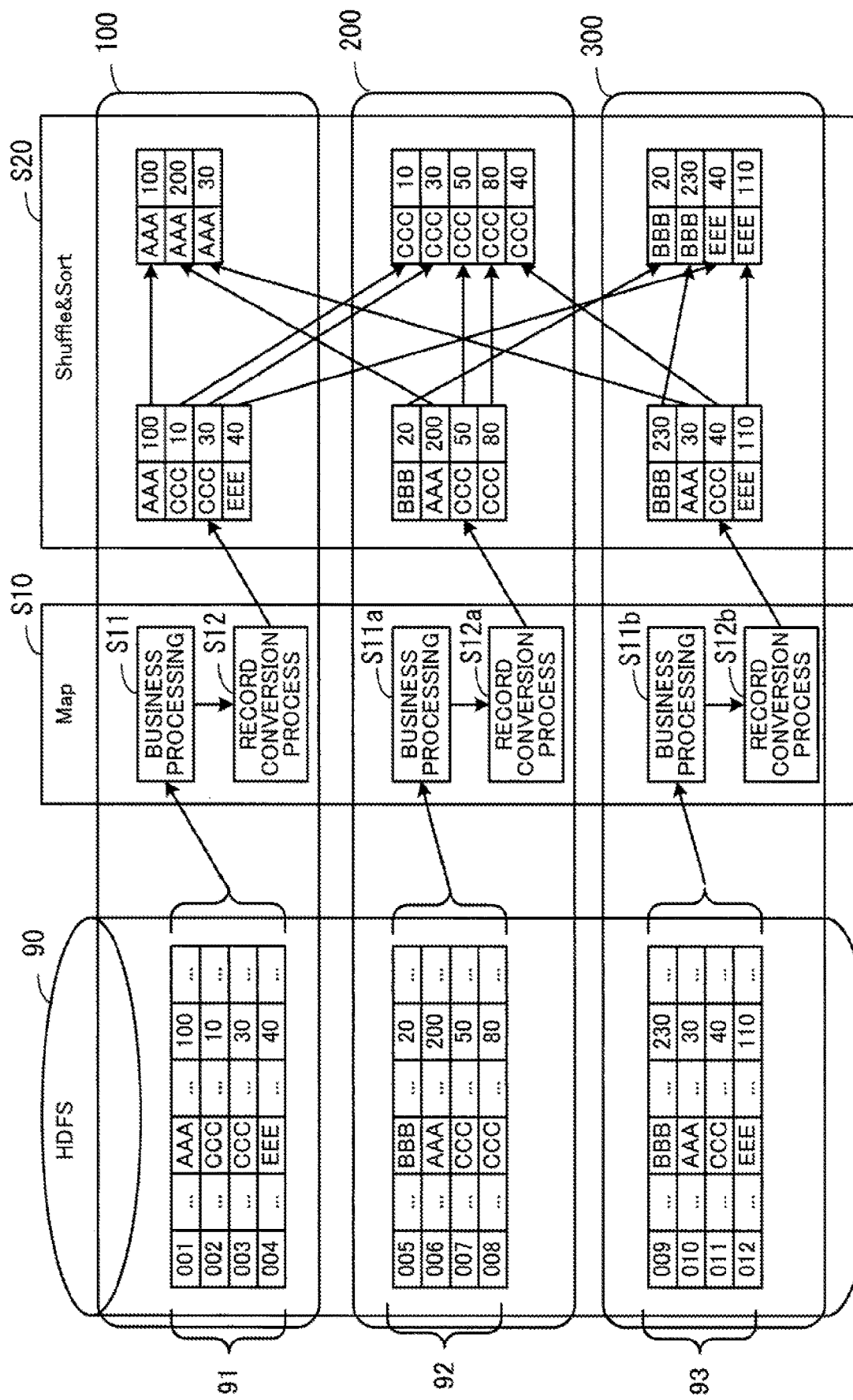
FIG. 10 illustrates the first half of a specific example of business processing.

FIG. 10 illustrates the first half of a specific example of business processing. The records in the HDFS 90 are divided into a plurality of data blocks 91 to 93. The data block 91 is managed by the file server 100. The data block 92 is managed by the file server 200. The data block 93 is managed by the file server 300.

When business processing starts, each of the file servers 100, 200, and 300 performs the Map process on the records managed therein. In the example of FIG. 10, in the record conversion process of the Map process, the items indicating a character string such as "AAA" or the like and the items indicating a numeric value such as "100" are retained, and the other items are deleted from all the records.

Then, in the Shuffle & Sort process (step S20), the records to be transferred are sorted using the character string as a key, and transferred to the file servers 100, 200, and 300. In the example of FIG. 10, records including a character string "AAA" are transferred to the file server 100. The records including a character string "BBB" are transferred to the file server 300. The records including a character string "CCC" are transferred to the file server 200. The records including a character string "EEE" are transferred to the file server 300.

Figure 11:
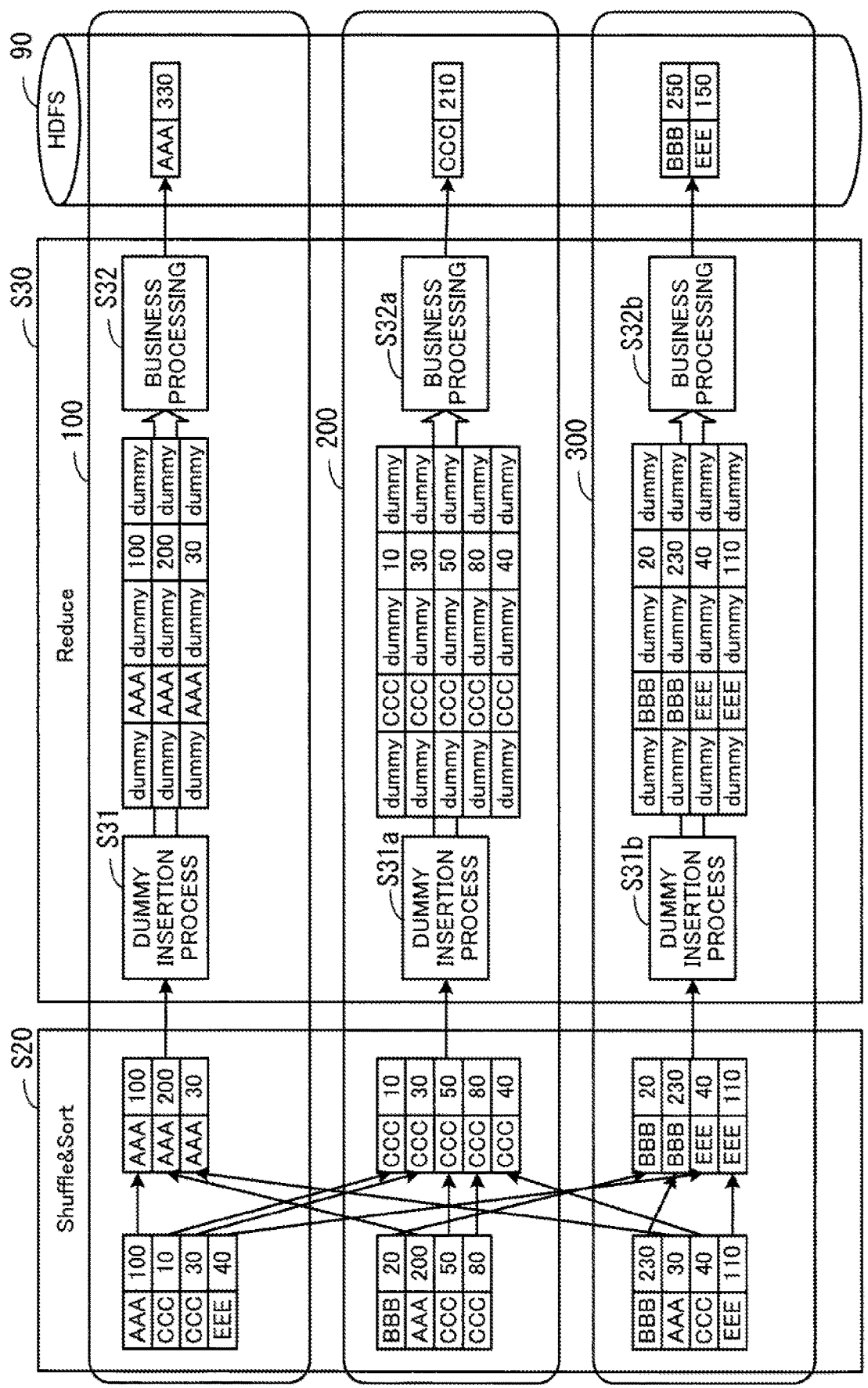
FIG. 11 illustrates the second half of the specific example of business processing.

FIG. 11 illustrates the second half of the specific example of business processing. The file servers 100, 200 and 300 insert dummy data into the records that are sorted by the Shuffle & Sort process. Then, business processing is performed on the records. Since the dummy data is inserted, it is possible to handle, in the business processing, the received records as records with the same structure as that of the records before the record conversion process. Therefore, it is possible to correctly aggregate the values (calculate the sum) by key, for example.

In this manner, since the data amount of each record is reduced by the record conversion process before the transfer in the Shuffle & Sort process, it is possible to reduce the total amount of data that is transferred. Further, since dummy data is inserted in place of the deleted items by the dummy insertion process after the data transfer, it is possible to handle the records as records having all the items in the subsequent business processing. This eliminates the need to modify the business processing program 40 even when the record conversion process is performed. That is, when dummy data is not inserted, the items in each record do not match the record definition of the business processing program 40, resulting in failing to correctly execute the business processing program 40. When dummy data is inserted in place of the deleted items by the dummy insertion process, the structure of each record matches the record definition, allowing to correctly execute the business processing program 40.

The following describes the importance of improving the communication efficiency in distributed processing.

Figure 12:
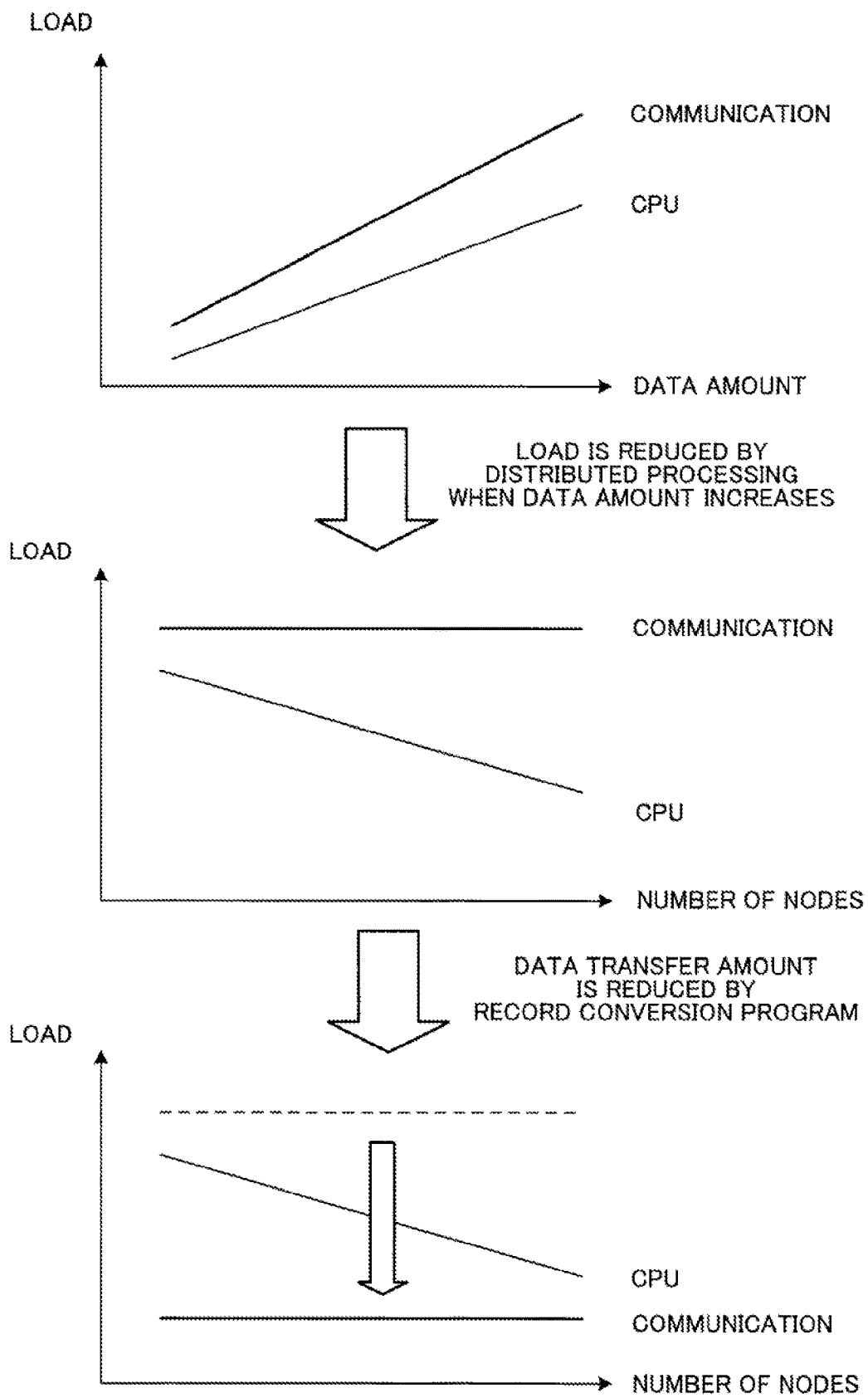
FIG. 12 illustrates the relationship between the CPU load and the communication load.

FIG. 12 illustrates the relationship between the CPU load and the communication load. As illustrated at the top of FIG. 12, as the data amount to be processed in the business processing increases, both the communication load and the CPU load linearly increase with respect to the data amount to be processed. Therefore, the ratio between the communication load and the CPU load remains unchanged. In view of this, the number of nodes of file servers may be increased as the data amount increases, such that the processing load per node is reduced by distributed processing.

As illustrated in the middle of FIG. 12, as the number of nodes increases, the amount of data processed by each node decreases, so that the CPU load for data processing decreases relatively. In this case, the data traffic per node decreases, but a part of the path becomes a bottleneck unless the data communication path is completely parallelized. As a result, the communication load remains unchanged.

Thus, by performing the record conversion process as illustrated in FIG. 10 to reduce the data transfer amount in the Shuffle & Sort process, it is possible to reduce the communication load as illustrated at the bottom of FIG. 12. As a result, it is possible to prevent a situation in which the data transfer becomes a bottleneck that prevents an improvement in the efficiency of distributed processing.

Note that the source file 50 of FIG. 5 is written in COBOL. When the source file 50 is written in COBOL, the following grammar rules unique to COBOL are the obstacles to generating a record conversion program and a dummy insertion program.

1) reference to group item (a group item is referenced by high-level name, both a higher level and a lower level are referenced)
2) overlapping item names (an item name in a record definition overlaps the name of another item).
3) partial reference to item (only a specific portion of each item is referenced)
4) use of OCCURS clause (repetition of data is declared)

The following describes the detail of the obstacles and how to deal with the obstacles.

First, a description will be given of the case where a group item is referenced. In COBOL, a group of a plurality of items (group item) may be defined. This corresponds to a structure of C language. In COBOL source code, when the record definition includes a group item, one of the following cases applies: a group item name is referenced; an element (child element) subordinate to a group item is referenced; and both a group item name and a child element are referenced. Each of these cases is handled as illustrated in FIGS. 13 to 16.

Figure 13:
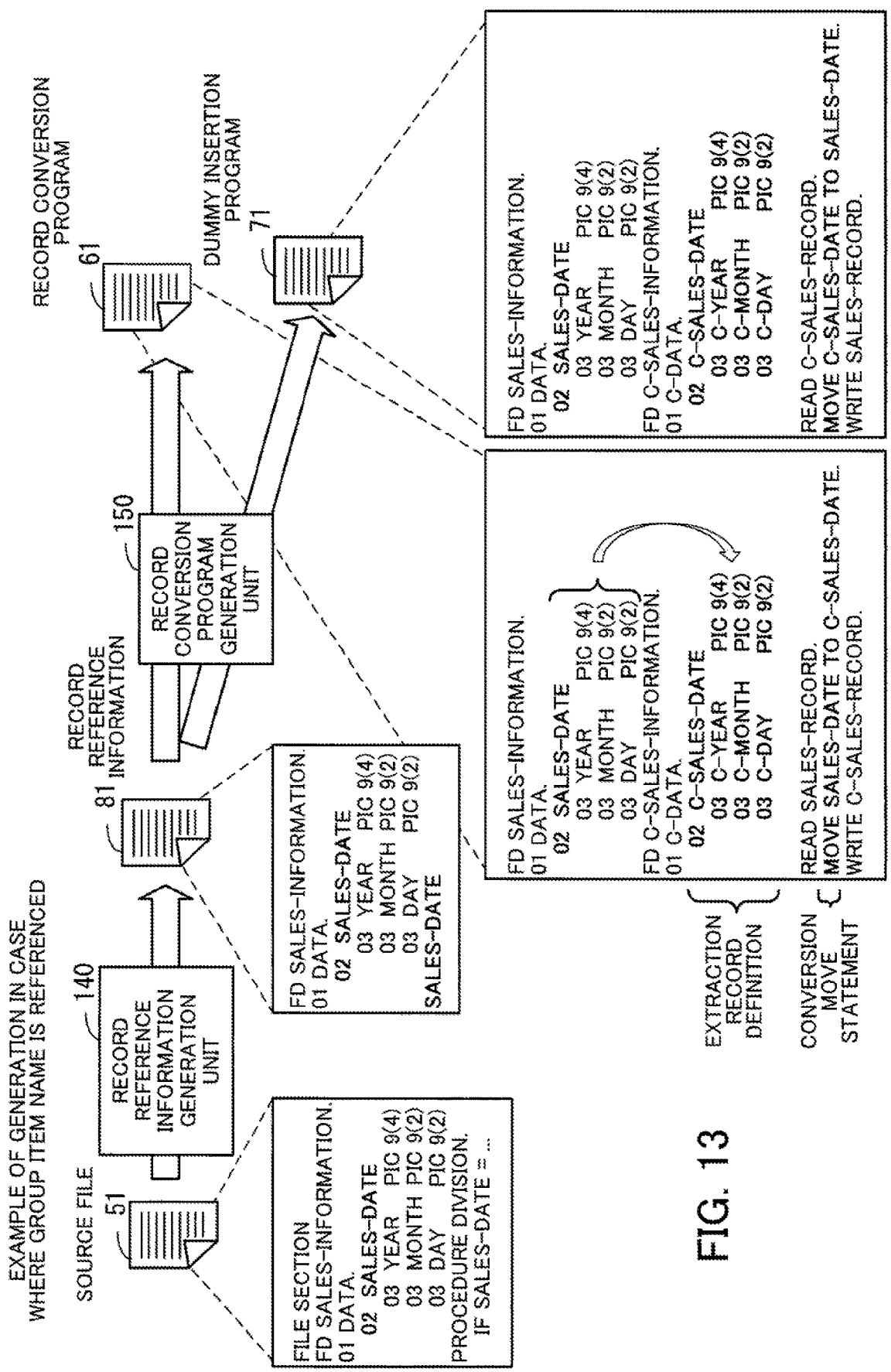
FIG. 13 illustrates an appropriate example of generating a record conversion program and a dummy insertion program in the case where a group item is referenced (a group item name is referenced)

FIG. 13 illustrates an appropriate example of generating a record conversion program and a dummy insertion program in the case where a group item is referenced (a group item name is referenced). In a source file 51 illustrated in FIG. 13, the item "SALES-DATE" is a group of "YEAR", "MONTH", and "DAY". That is, the item "SALES-DATE" is a group item.

In the case where the item name of a group item is contained as an object to be referenced in the source file 51, the child elements of the group item are also the objects to be processed. In this case, if only the item name described in the source file 51 is extracted, the child elements are not extracted.

In view of the above, the record reference information generation unit 140 adds the item names of the child elements to record reference information 81 to be created. In the example of FIG. 13, according to the description "SALES-DATE", "YEAR", "MONTH", and "DAY" are added in addition to "SALES-DATE". Based on the thus generated record reference information 81, the record conversion program generation unit 150 generates a record conversion program 61 and a dummy insertion program 71. Thus, the definitions of the child elements are included in an extraction record definition. Note that as for the conversion MOVE statement, code may be generated without specifically considering whether the item is a group item.

Figure 14:
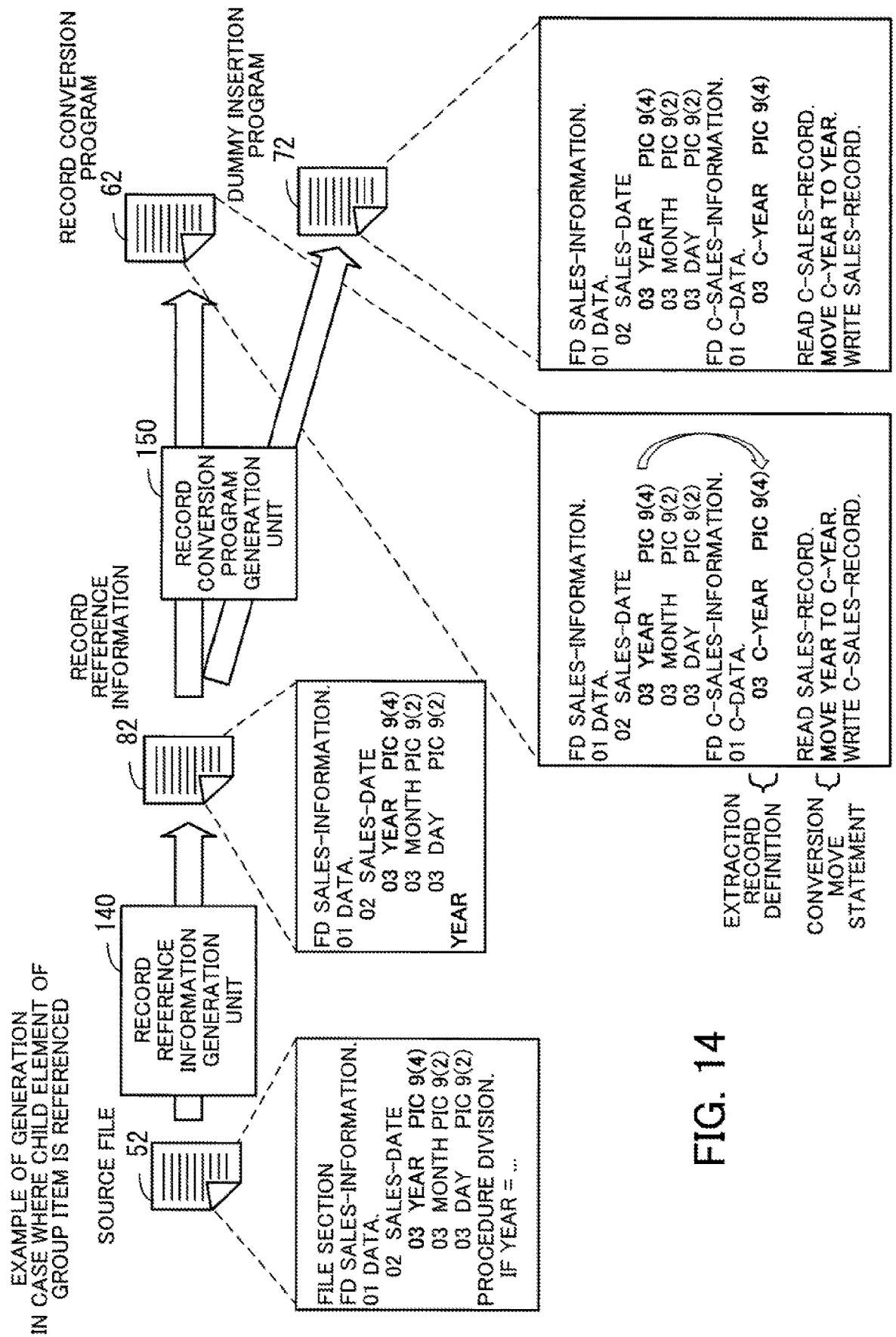
FIG. 14 illustrates an appropriate example of generating a record conversion program and a dummy insertion program in the case where a group item is referenced (a child element of a group item is referenced)

FIG. 14 illustrates an appropriate example of generating a record conversion program and a dummy insertion program in the case where a group item is referenced (a child element of a group item is referenced). In a source file 52 illustrated in FIG. 14, the item name "YEAR" of a child element of the group item "SALES-DATE" is contained as an object to be referenced.

In the case where only a specific child element of a group item is contained as an object to be referenced as described above, the record reference information generation unit 140 adds only the item name to be referenced to record reference information 82 as usually does. That is, the name of the higher-level group item is not added. Based on the thus generated record reference information 82, the record conversion program generation unit 150 generates a record conversion program 62 and a dummy insertion program 72. Thus, the definition of the child element is included in an extraction record definition. Note that as for the conversion MOVE statement, code may be generated without specifically considering whether the item is a group item.

Figure 15:
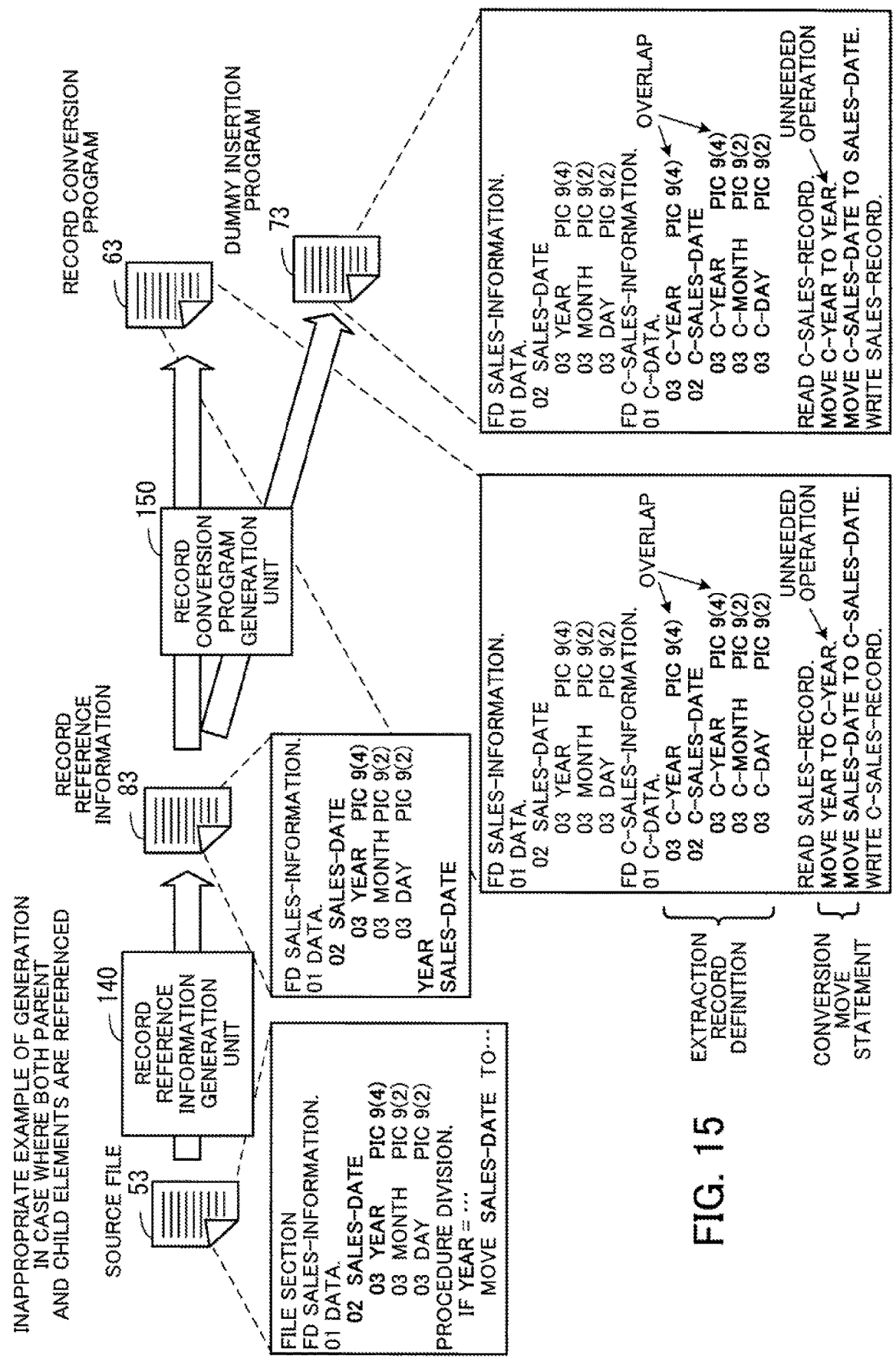
FIG. 15 illustrates an inappropriate example of generating a record conversion program and a dummy insertion program in the case where a group item is referenced (both a group item name and a child element are referenced)

FIG. 15 illustrates an inappropriate example of generating a record conversion program and a dummy insertion program in the case where a group item is referenced (both a group item name and a child element are referenced). In a source file 53 illustrated in FIG. 15, the item name of the group item "SALES-DATE" and the item name "YEAR" of a child element thereof are contained as objects to be referenced.

In the case where both a group item name and the item name of a child element are contained in the source file 53 as described above, when the item names are extracted in accordance with the procedure described in FIGS. 13 and 14, a record conversion program 63 and a dummy insertion program 73 illustrated in FIG. 15 are generated. In this case, there are overlapping item names in the extraction record definition, resulting in failing to compile and generate a record conversion program. In the example of FIG. 15, there are overlapping descriptions of the child element "YEAR" in the extraction record definition. Note that an overlap of item names is easily avoided by assigning serial numbers or by other methods. However, since the information on a child element is included in the parent element, some space is wasted in the extraction record definition. Accordingly, the area size is increased compared to that of the record before the conversion.

Further, each of the record conversion program and the dummy insertion program 73 includes a conversion MOVE statement that performs an unneeded copy operation for the unwanted extraction item. In the example of FIG. 15, a conversion MOVE statement "MOVE SALES-DATE TO C-SALES-DATE" copies the entire group item. That is, the value of the record of the child element "YEAR" is also copied. Therefore, the conversion MOVE statement "MOVE YEAR TO C-YEAR" is an unneeded operation.

Figure 16:
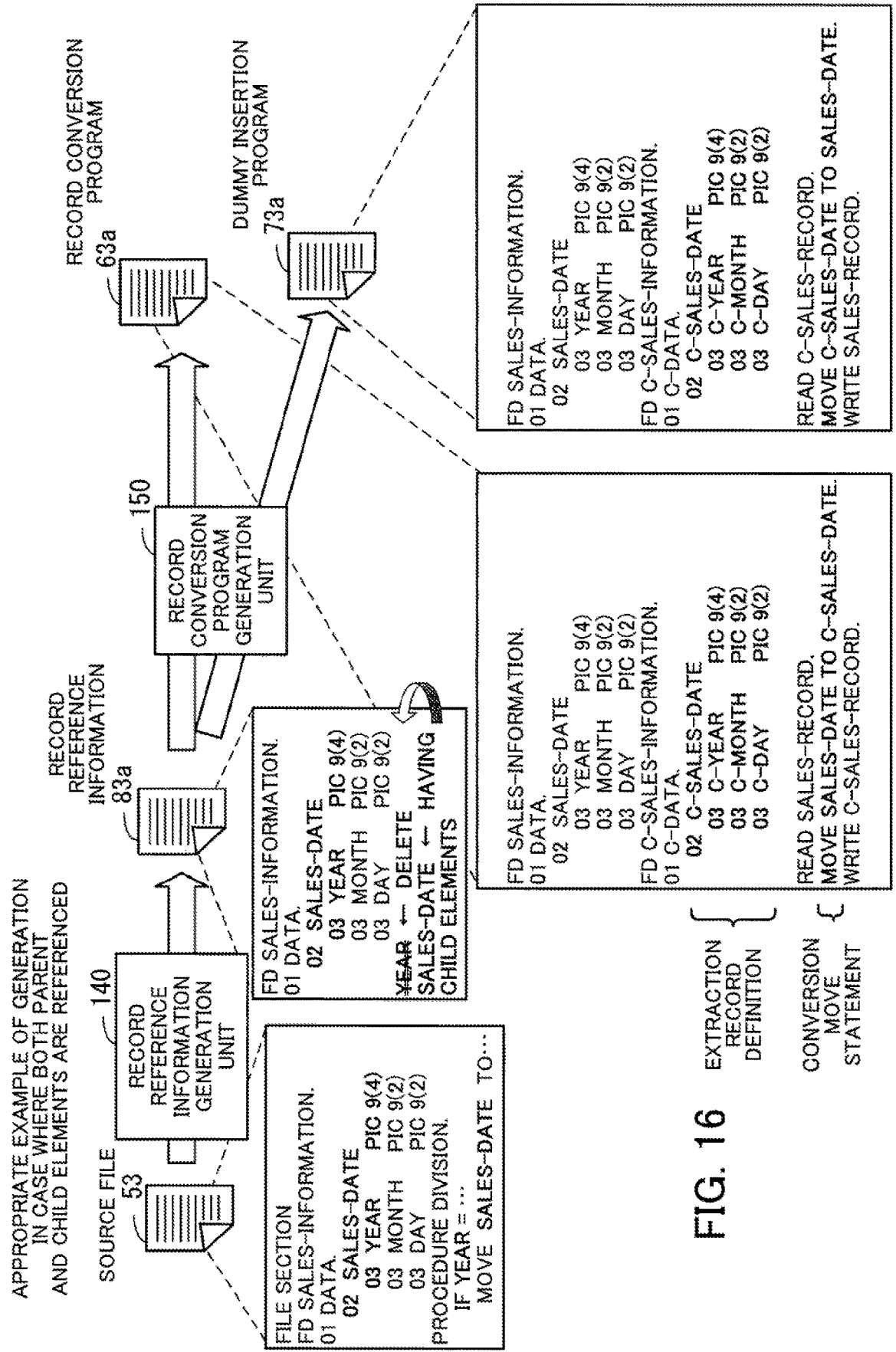
FIG. 16 illustrates an appropriate example of generating a record conversion program and a dummy insertion program in the case where a group item is referenced (both a group item name and a child element are referenced)

FIG. 16 illustrates an appropriate example of generating a record conversion program and a dummy insertion program in the case where a group item is referenced (both a group item name and a child element are referenced). In the example of FIG. 16, the record reference information generation unit 140 analyzes the source file 53, and scans record reference information 83a. Then, if the parent element of a group item is specified, the record reference information generation unit 140 deletes reference information of the child elements. In the example of FIG. 16, the item name "SALES-DATE" has child elements, and the child elements include an item name "YEAR". Accordingly, "YEAR" is deleted from the record reference information 83a.

Based on the thus generated record reference information 83a, a record conversion program 63a and a dummy insertion program 73a are generated. Accordingly, appropriate programs are generated that do not include an overlap in the extraction record definition or an unneeded conversion MOVE statement.

As described above, even when a group item is referenced, it is possible to appropriately generate a record conversion program and a dummy insertion program.

The following describes the case where there are overlapping item names.

Figure 17:
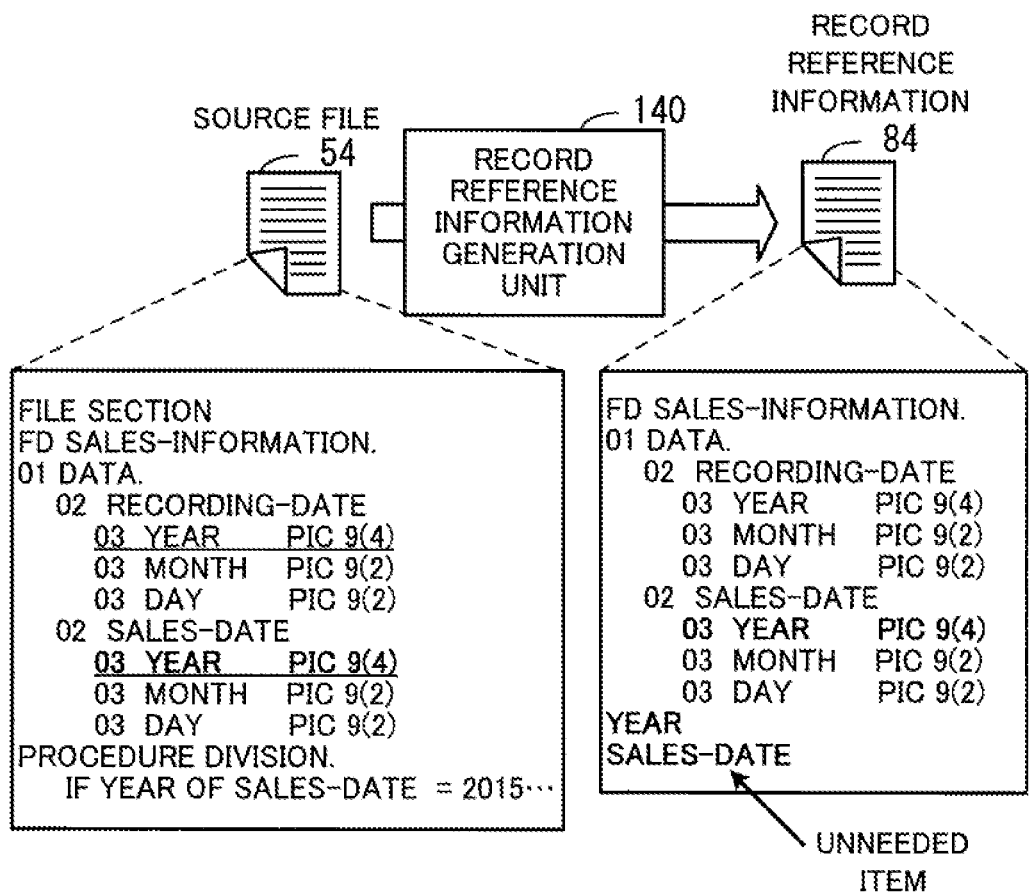
FIG. 17 illustrates an inappropriate example of generating record reference information in the case where there are overlapping item names.

FIG. 17 illustrates an inappropriate example of generating record reference information in the case where there are overlapping item names. In the COBOL grammar, overlapping use of the exactly same item name is allowed. However, this is based on the premise that the item name is uniquely identified by a modifier (OF or IN . . . ). In the example of FIG. 17, a source file 54 includes a record definition of the item name "YEAR" as a child element of a group item "RECORDING-DATE", and a record definition of the item name "YEAR" as a child element of a group item "SALES-DATE".

In the case where there is overlapping use of an item name as described above, a record is referenced by a description "IF YEAR OF SALES-DATE=2015 . . . " in the source file 54 of FIG. 17. This indicates that the child element "YEAR" of the group item "SALES-DATE" is referenced. However, when focusing only on the item name described in the source file 54, the item with the item name "SALES-DATE" is mistaken as being referenced. In reality, reference is not made to the entire item with the item name "SALES-DATE", and therefore "SALES-DATE" described in record reference information 84 is not needed. That is, when "SALES-DATE" is contained in the record reference information 84, all the items included in "SALES-DATE" are extracted as an extraction record definition as illustrated in FIG. 13. Thus, the records corresponding to the items "MONTH" and "DAY" of "SALES-DATE" that are not referenced are also transferred in the Shuffle & Sort process.

Figure 18:
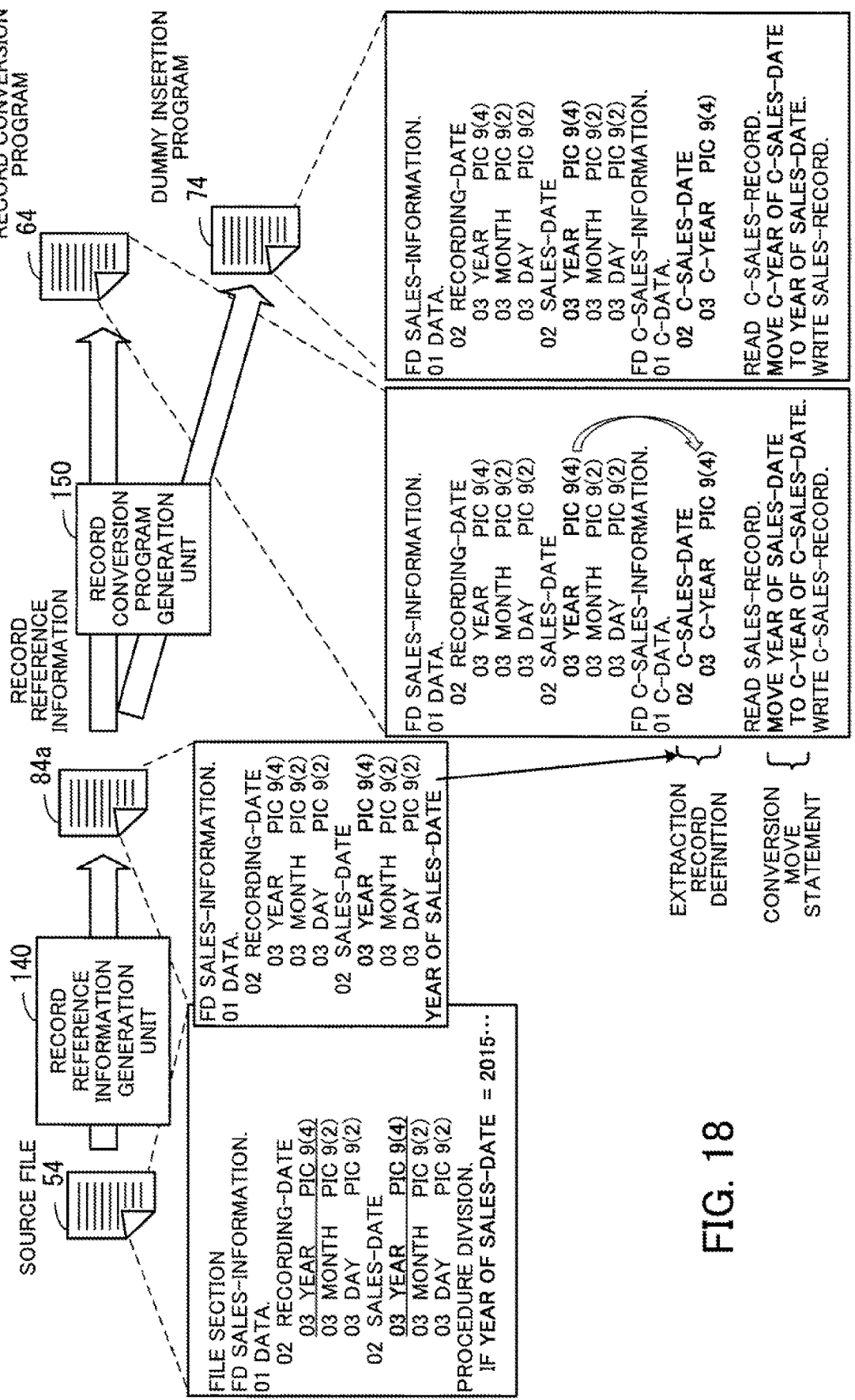
FIG. 18 illustrates an appropriate example of generating a record conversion program and a dummy insertion program in the case where there are overlapping item names.

FIG. 18 illustrates an appropriate example of generating a record conversion program and a dummy insertion program in the case where there are overlapping item names. In the example of FIG. 18, if a modifier (ON or IN . . . ) is included in the source file 54, the record reference information generation unit 140 eliminates the parent element following "OF" or "IN" from the objects to be extracted, and adds a structure including the modifier to record reference information 84a. In the example of FIG. 18, "SALES-DATE" following "OF" of the modifier is eliminated from the objects to be extracted, while the item name "YEAR" is extracted with the modifier as "YEAR OF SALES-DATE", so that the item name including the modifier is added to the record reference information 84a. Based on the record reference information 84a, a record conversion program 64 and a dummy insertion program 74 are created. Thus, each program includes an extraction record definition of the group item and the item name that is referenced, and a conversion MOVE statement including the modifier. By executing a record conversion process and a dummy insertion process based on the record conversion program 64 and the dummy insertion program 74, it is possible to transfer data without including unneeded items in the records, and thus to reduce the data transfer amount.

In this manner, even when there are overlapping item names, it is possible to prevent transfer of unneeded data and thus to perform efficient data transfer.

The following describes the case where an item is partially referenced.

Figure 19:
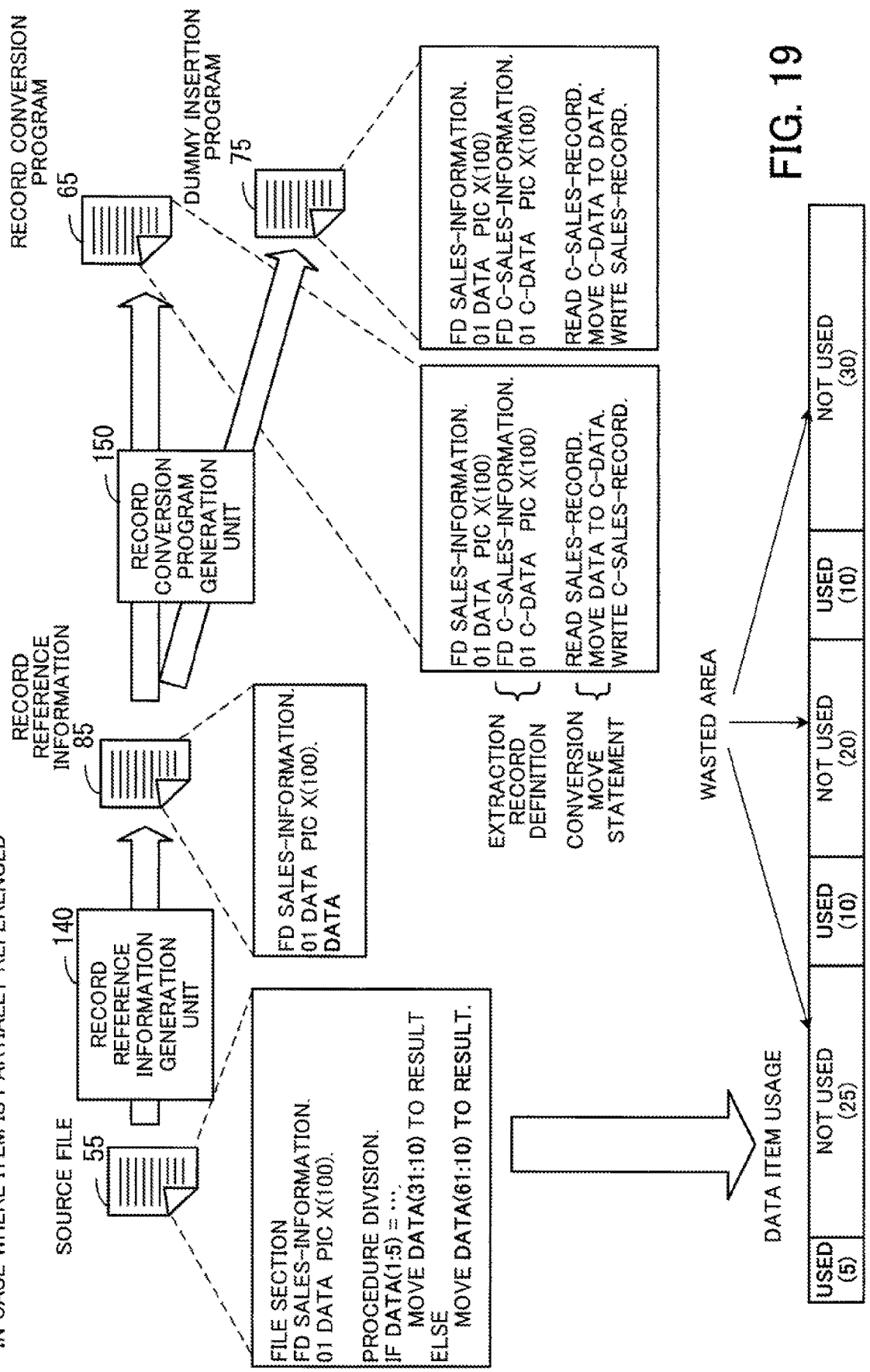
FIG. 19 illustrates an inappropriate example of generating a record conversion program and a dummy insertion program in the case where an item is partially referenced.

FIG. 19 illustrates an inappropriate example of generating a record conversion program and a dummy insertion program in the case where an item is partially referenced. In COBOL, it is possible to reference a portion of data of each item. In the case where a source file 55 contains a description indicating partial reference, if an item name is simply extracted, the entire area is specified to be held although the data is partially referenced. Accordingly, the effect of reducing the data amount is not achieved. In the example of FIG. 19, the source file 55 contains a description "DATA(1:5)". In this description, the value in the parenthesis is a reference portion designation designating a portion to be referenced, and indicates that the first bit to the fifth bit in the item name "DATA" is referenced. However, if the item name is simply extracted, only the item name "DATA" is added to record reference information 85. Then, a conversion MOVE statement that copies the entire data is inserted in each of a record conversion program 65 and a dummy insertion program 75. As a result, the entire data including an unneeded area that is not actually used is transferred in the Shuffle & Sort process.

Figure 20:
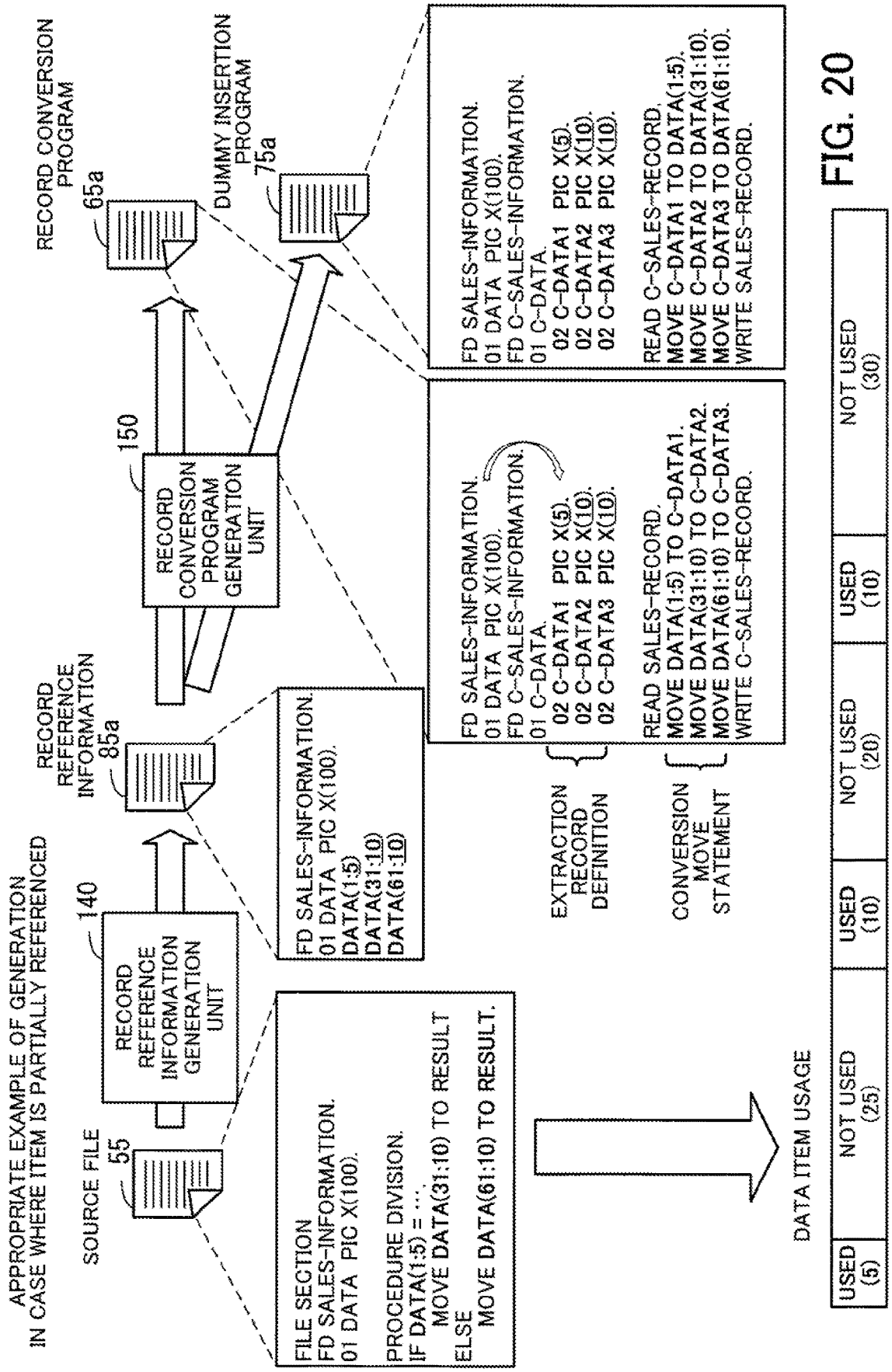
FIG. 20 illustrates an appropriate example of generating a record conversion program and a dummy insertion program in the case where an item is partially referenced.

FIG. 20 illustrates an appropriate example of generating a record conversion program and a dummy insertion program in the case where an item is partially referenced. In the case where an item name contains partial reference, the record reference information generation unit 140 adds, to record reference information 85a, the item name contained in the source file 55 as an object to be referenced, including the partial reference status. Based on the thus generated record reference information 85a, the record conversion program generation unit 150 adds, to each of a record conversion program 65a and a dummy insertion program 75a, an extraction record definition and a conversion MOVE statement, including the partial reference status. Thus, in the record conversion process, only the bits to be referenced in the item to be referenced are retained, and the bits that are not used are deleted.

In this manner, in the case where an item is partially referenced, the data transfer amount in the Shuffle & Sort process is reduced, so that the communication efficiency is improved.

The following describes the case where an OCCURS clause is used.

Figure 21:
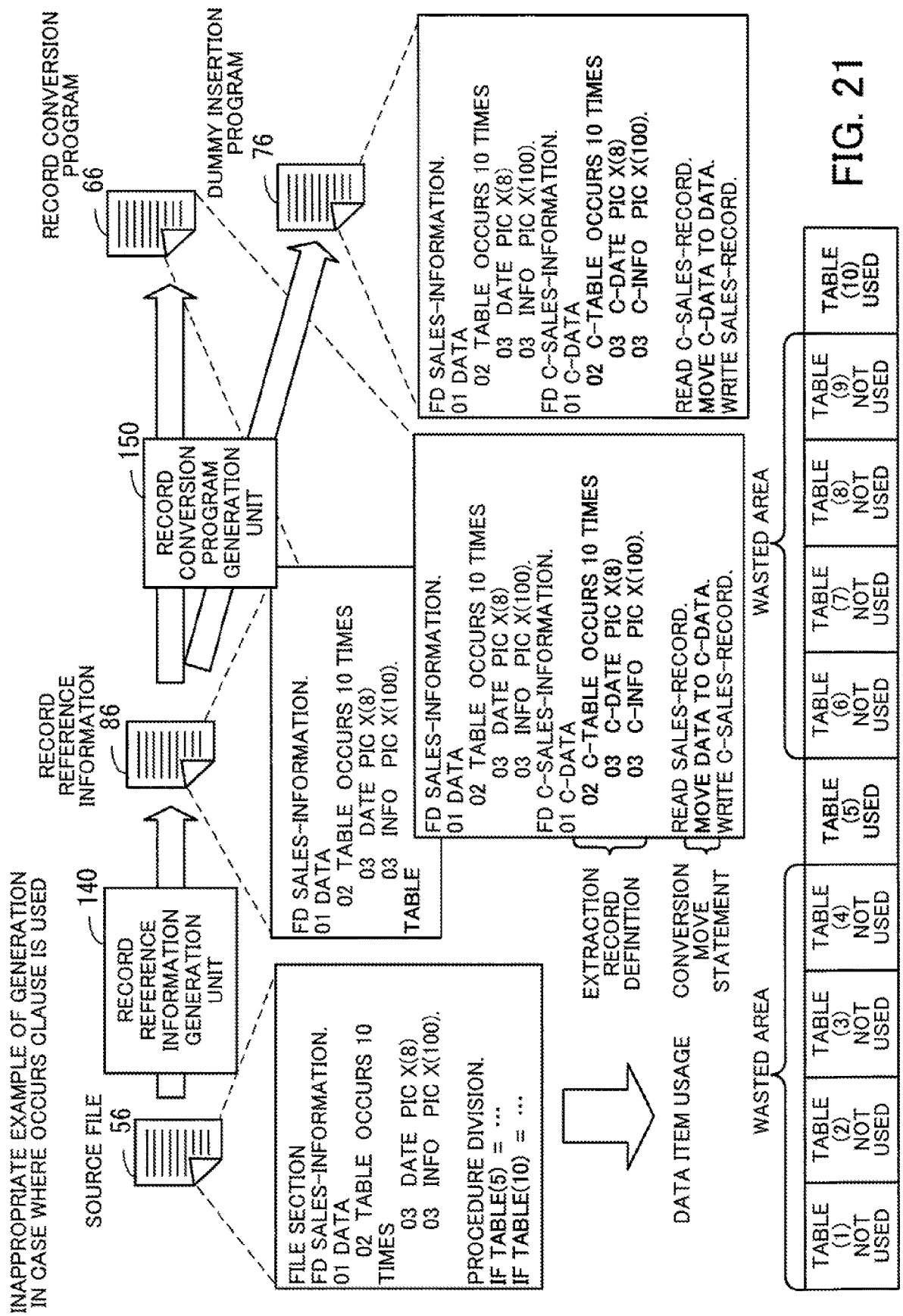
FIG. 21 illustrates an inappropriate example of generating a record conversion program and a dummy insertion program in the case where an OCCURS clause is used.

FIG. 21 illustrates an inappropriate example of generating a record conversion program and a dummy insertion program in the case where an OCCURS clause is used. In a record definition in COBOL, if a specific structure iterates, an OCCURS clause may be used to omit the description of elements in the iterations. In the case where an OCCURS clause is used, if an item name is simply extracted, all the elements of OCCURS are referenced. Accordingly, the effect of reducing the data amount is not achieved. For instance, in the example of FIG. 21, ten tables are defined in a source file 56. Among those, only the fifth and tenth tables in order of occurrence of tables are actually used. If an item name "TABLE" is added to record reference information 86, a conversion MOVE statement that copies all the tables is inserted in each of a record conversion program 66 and a dummy insertion program 76. As a result, all the tables are transferred in the Shuffle & Sort process.

Figure 22:
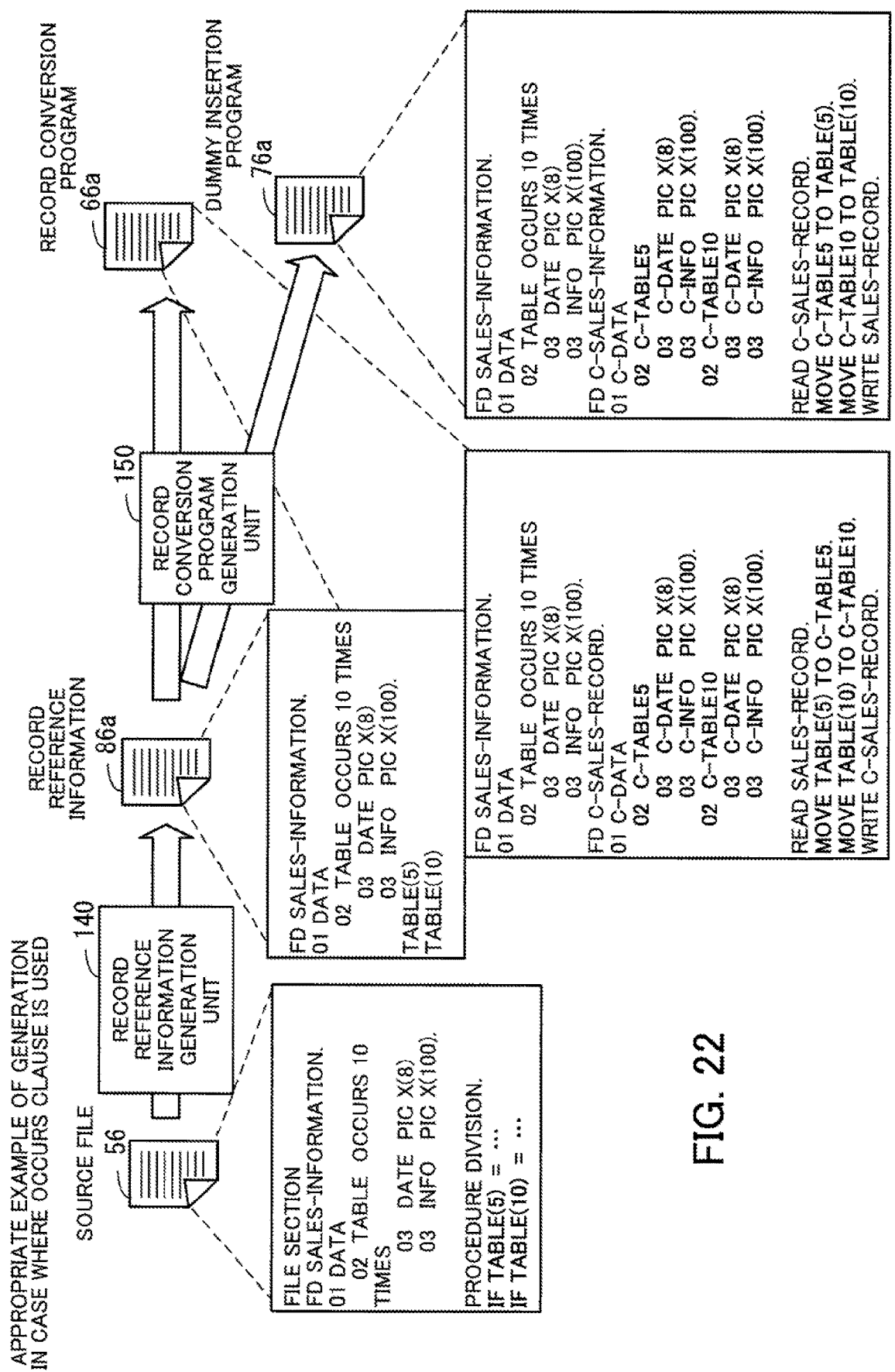
FIG. 22 illustrates an appropriate example of generating a record conversion program and a dummy insertion program in the case where an OCCURS clause is used.

FIG. 22 illustrates an appropriate example of generating a record conversion program and a dummy insertion program in the case where an OCCURS clause is used. In the case where an item name includes reference to a specific element of OCCURS, the record reference information generation unit 140 adds, to record reference information 86a, the item name contained in the source file 55 as an object to be referenced, including the OCCURS reference status. Based on the record reference information 86a, the record conversion program generation unit 150 adds, to each of a record conversion program 66a and a dummy insertion program 76a, an extraction record definition and conversion MOVE statements with the OCCURS reference status taken into account.

In this manner, in the case where an item name includes reference to a specific element of OCCURS, the data transfer amount in the Shuffle & Sort process is reduced, so that the communication efficiency is improved.

Hereinafter, the detailed procedures of a record reference information generation process and a record conversion program generation process will be described with reference to flowcharts.

First, a record reference information generation process will be described.

Figure 23:
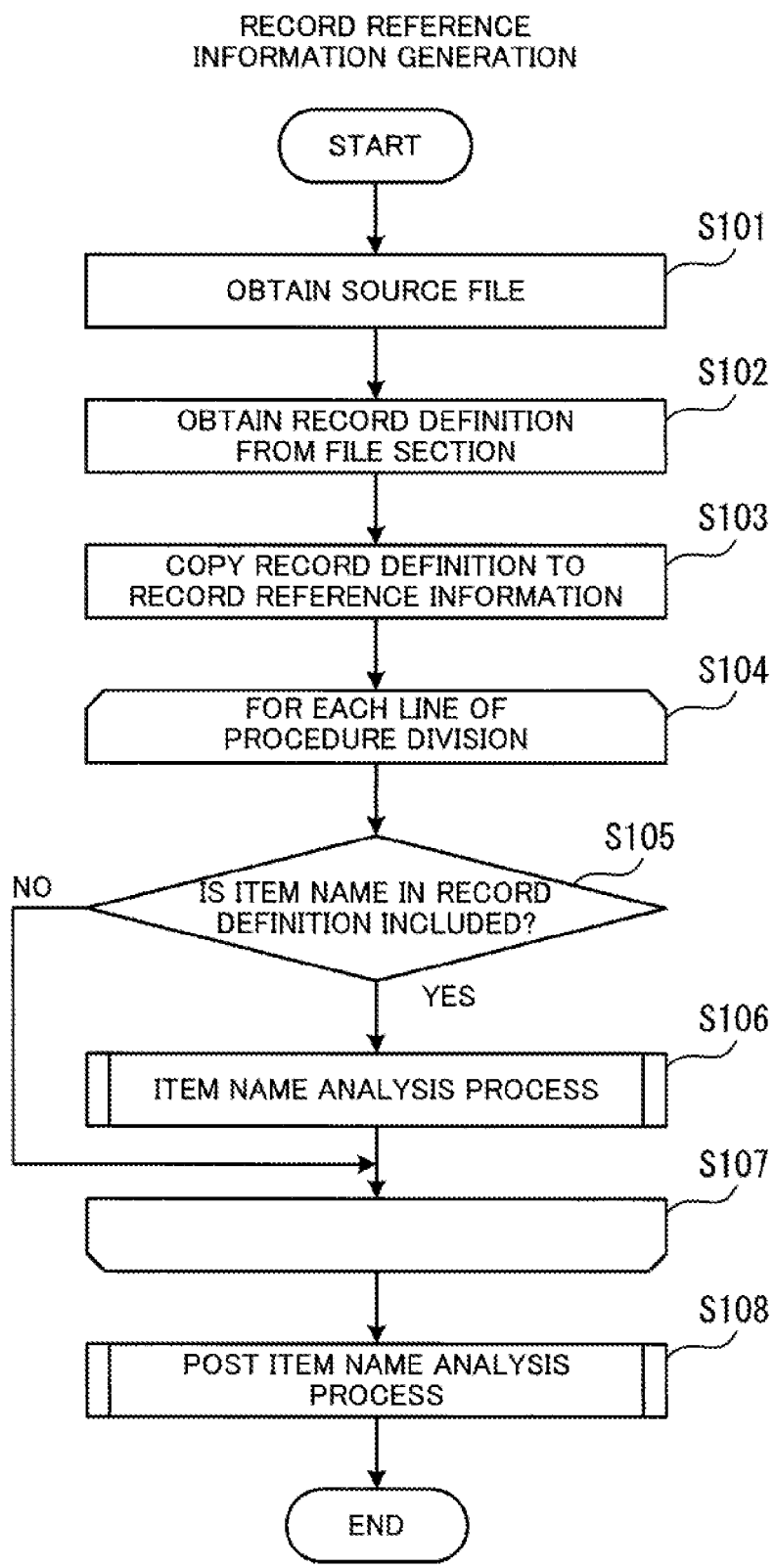
FIG. 23 is a flowchart illustrating an exemplary procedure of a record reference information generation process.

FIG. 23 is a flowchart illustrating an exemplary procedure of a record reference information generation process. In the following, the process illustrated in FIG. 23 will be described step by step.

(Step S101) The record reference information generation unit 140 obtains a source file of a business processing program to be executed. For example, the record reference information generation unit 140 reads a source file specified by the user, from the program storage unit 130.

(Step S102) The record reference information generation unit 140 obtains a record definition from "FILE SECTION" in the source file.

(Step S103) The record reference information generation unit 140 copies the record definition read from the source file to the record reference information.

(Step S104) The record reference information generation unit 140 executes operations of steps S105 to S106 on each line of "PROCEDURE DIVISION" of the source file.

(Step S105) The record reference information generation unit 140 determines whether the line under processing includes an item name indicated by the record definition. If an item name is included, the procedure proceeds to step S106. If an item name is not included, the procedure proceeds to step S107.

(Step S106) The record reference information generation unit 140 performs an item name analysis process on the item name included in the line under processing. This process will be described below in detail (see FIG. 24).

(Step S107) When the record reference information generation unit 140 completes execution of the operations of steps S105 and S106 on all the lines of "PROCEDURE DIVISION", the procedure proceeds to step S108.

(Step S108) The record reference information generation unit 140 performs a post item name analysis process. This process will be described below in detail (see FIG. 25).

With the procedure described above, the record reference information is generated.

Next, an item name analysis process will be described in detail.

Figure 24:
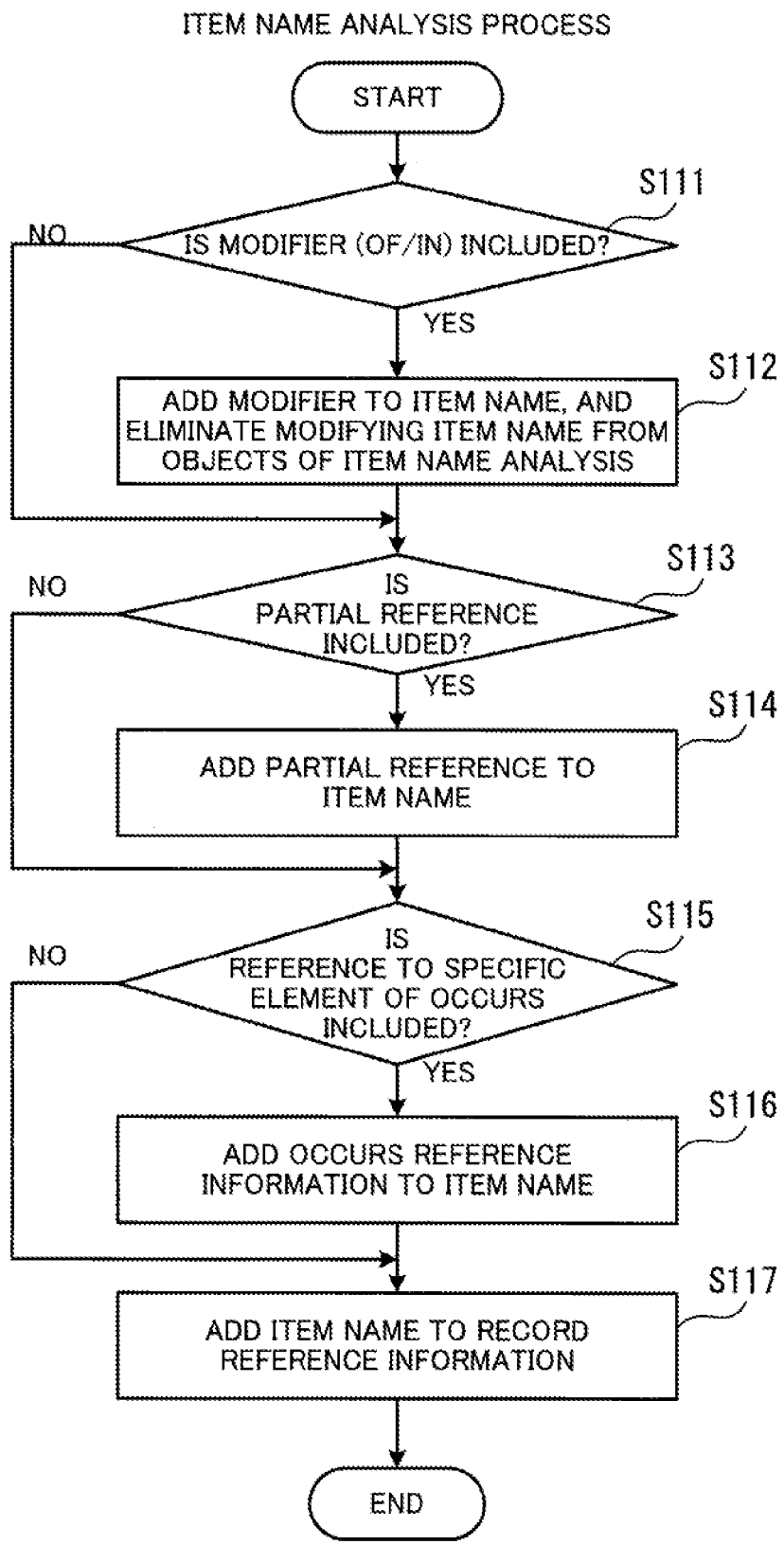
FIG. 24 is a flowchart illustrating an exemplary procedure of an item name analysis process.

FIG. 24 is a flowchart illustrating an exemplary procedure of an item name analysis process. In the following, the process illustrated in FIG. 24 will be described step by step.

(Step S111) The record reference information generation unit 140 determines whether the line under processing includes a modifier (OF or IN . . . ) that modifies the item name under analysis. If a modifier is included, the procedure proceeds to step S112. If a modifier is not included, the procedure proceeds to step S113.

(Step S112) The record reference information generation unit 140 adds the modifier to the item name under analysis.

In this case, the item name with the modifier is added to the record reference information. Meanwhile, the record reference information generation unit 140 eliminates the item name modifying the item name under analysis from the objects to be extracted. In the example of FIG. 18, referring to "IF YEAR OF SALES-DATE=2015 . . . " in "PROCEDURE DIVISION" of the source file 54, a modifier "OF SALES-DATE" is added to the item name "YEAR". Thus, "YEAR OF SALES-DATE" is added to the record reference information. Meanwhile, the modifying item name "SALES-DATE" is eliminated from the objects of the item name analysis process. The "SALES-DATE" eliminated from the objects of item name analysis process is prevented from being extracted to the record reference information as an independent element.

(Step S113) The record reference information generation unit 140 determines whether the item name under analysis includes a description indicating partial reference. If a description indicating partial reference is included, the procedure proceeds to step S114. If a description indicating partial reference is not included, the procedure proceeds to step S115.

(Step S114) The record reference information generation unit 140 adds a description indicating partial reference to the item name under analysis. In this case, the item name with partial reference is added to the record reference information. In the example of FIG. 20, the item name "DATA(1:5)" including partial reference in "PROCEDURE DIVISION" of the source file 55 is added to the record reference information.

(Step S115) The record reference information generation unit 140 determines whether the item name under analysis includes reference to a specific element of OCCURS. If reference to a specific element of OCCURS is included, the procedure proceeds to step S116. If reference to a specific element of OCCURS is not included, the procedure proceeds to step S117.

(Step S116) The record reference information generation unit 140 adds OCCURS reference information to the item name under analysis. In this case, the item name with the OCCURS reference information is added to the record reference information. In the example of FIG. 22, the item name "TABLE(5)" in "PROCEDURE DIVISION" of the source file 56 is added to the record reference information.

(Step S117) The record reference information generation unit 140 adds the item name under analysis to the record reference information.

The operations described above are performed on each item name in "PROCEDURE DIVISION", so that the item names indicating the items to be referenced in the business processing are listed as objects to be referenced. The list of item names to be referenced is hereinafter referred to as an item name list.

Next, a post item name analysis process will be described in detail.

Figure 25:
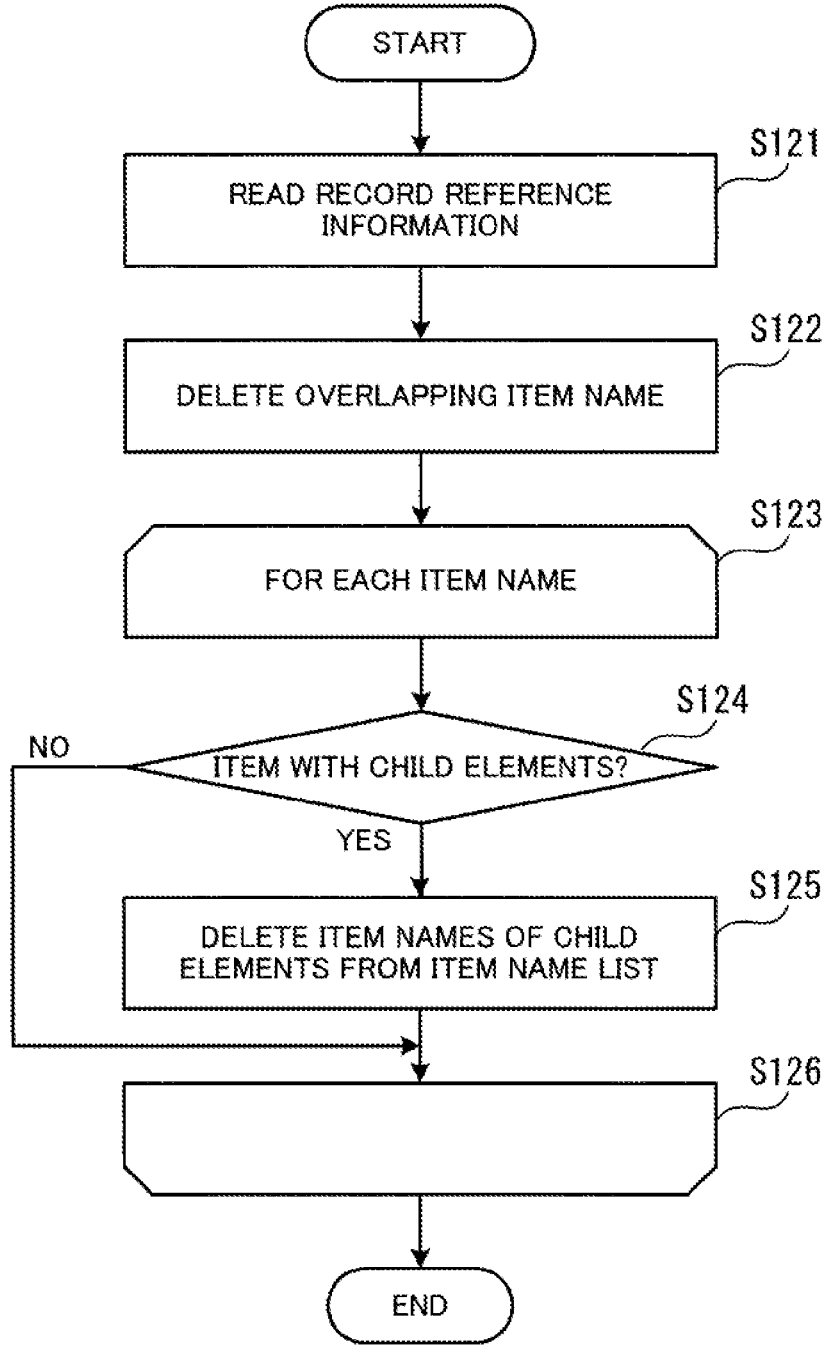
FIG. 25 is a flowchart illustrating an exemplary procedure of a post item name analysis process.

FIG. 25 is a flowchart illustrating an exemplary procedure of a post item name analysis process. In the following, the process illustrated in FIG. 25 will be described step by step.

(Step S121) The record reference information generation unit 140 reads the record reference information from the program storage unit 130.

(Step S122) The record reference information generation unit 140 retains one of overlapping item names on the list, and deletes the other overlapping item names. For example, if there are a plurality of item names that are identical to each other, including the information (such as a modifier or the like) added thereto, one of the item names is retained and the other item names are deleted.

(Step S123) The record reference information generation unit 140 executes operations of steps S124 and S125 on each item on the item name list.

(Step S124) The record reference information generation unit 140 determines whether the item name under processing is the item name of an item having child elements. A determination as to whether an item has child elements may be made based on a record definition copied to the record reference information. If the item has child elements, the procedure proceeds to step S125. If the item does not have child elements, the procedure proceeds to step S126.

(Step S125) The record reference information generation unit 140 deletes the item names of the child elements from the item name list to be referenced. In the example of FIG. 16, when the item name in the record reference information 83*a* under processing is "SALES-DATE", the item name "YEAR" that is the child element of "SALES-DATE" is deleted from the item name list of the record reference information 83*a*.

(Step S126) When the record reference information generation unit 140 completes the operations of steps S124 and S125 on all the item names on the item name list, the post item name analysis process ends.

In the manner described above, the record reference information is generated. The generated record reference information is transmitted to the record conversion program generation unit 150. Then, the record conversion program generation unit 150 generates a record conversion program and a dummy insertion program, based on the record reference information.

Figure 26:
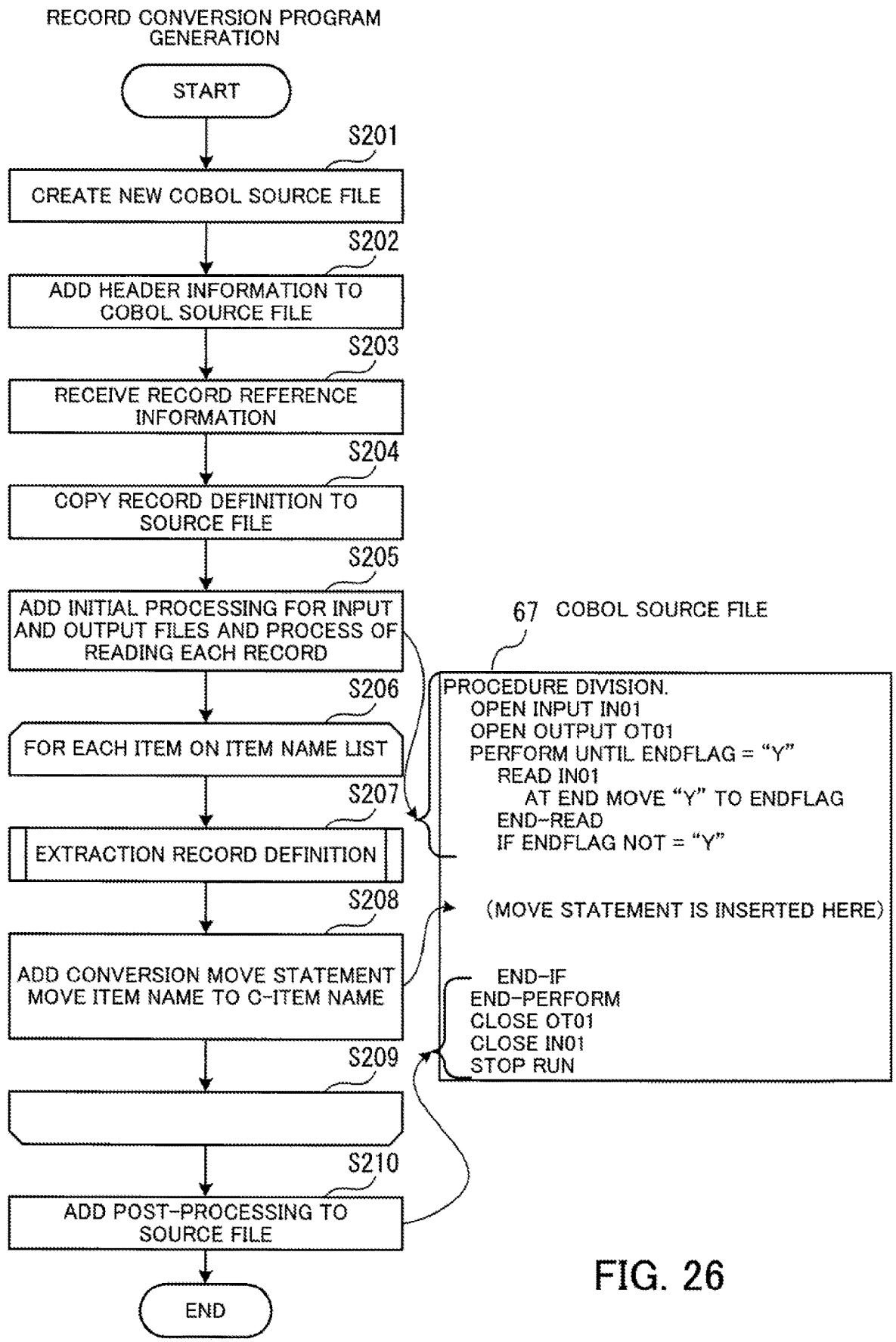
FIG. 26 is a flowchart illustrating an exemplary procedure of a record conversion program generation process.

FIG. 26 is a flowchart illustrating an exemplary procedure of a record conversion program generation process. In the following, the process illustrated in FIG. 26 will be described step by step.

(Step S201) The record conversion program generation unit 150 creates a new COBOL source file 67.

(Step S202) The record conversion program generation unit 150 adds header information to the COBOL source file 67.

(Step S203) The record conversion program generation unit 150 receives record reference information.

(Step S204) The record conversion program generation unit 150 copies the record definition in the record reference information to the COBOL source file 67.

(Step S205) The record conversion program generation unit 150 adds, to the COBOL source file 67, initial processing for input and out files and a process of reading each record.

(Step S206) The record conversion program generation unit 150 executes operations of steps S207 and S208 on each item name on the item name list of the record reference information.

(Step S207) The record conversion program generation unit 150 executes an extraction record definition process on the item name under processing. This process will be described below in detail (see FIG. 27).

(Step S208) The record conversion program generation unit 150 adds a conversion MOVE statement to the COBOL source file 67. The conversion MOVE statement added herein is written in a format "MOVE item name TO C-item name". Note that in the case where the copied item name is changed in the extraction record definition process of step S207, the changed item name is used.

(Step S209) When the record conversion program generation unit 150 completes the operations of steps S207 and S208 on all items on the item name list, the procedure proceeds to step S210.

(Step S210) The record conversion program generation unit 150 adds post-processing to the COBOL source file 67.

The COBOL source file 67 generated with the procedure described above is compiled, so that a record conversion program in an executable format is generated.

Figure 27:
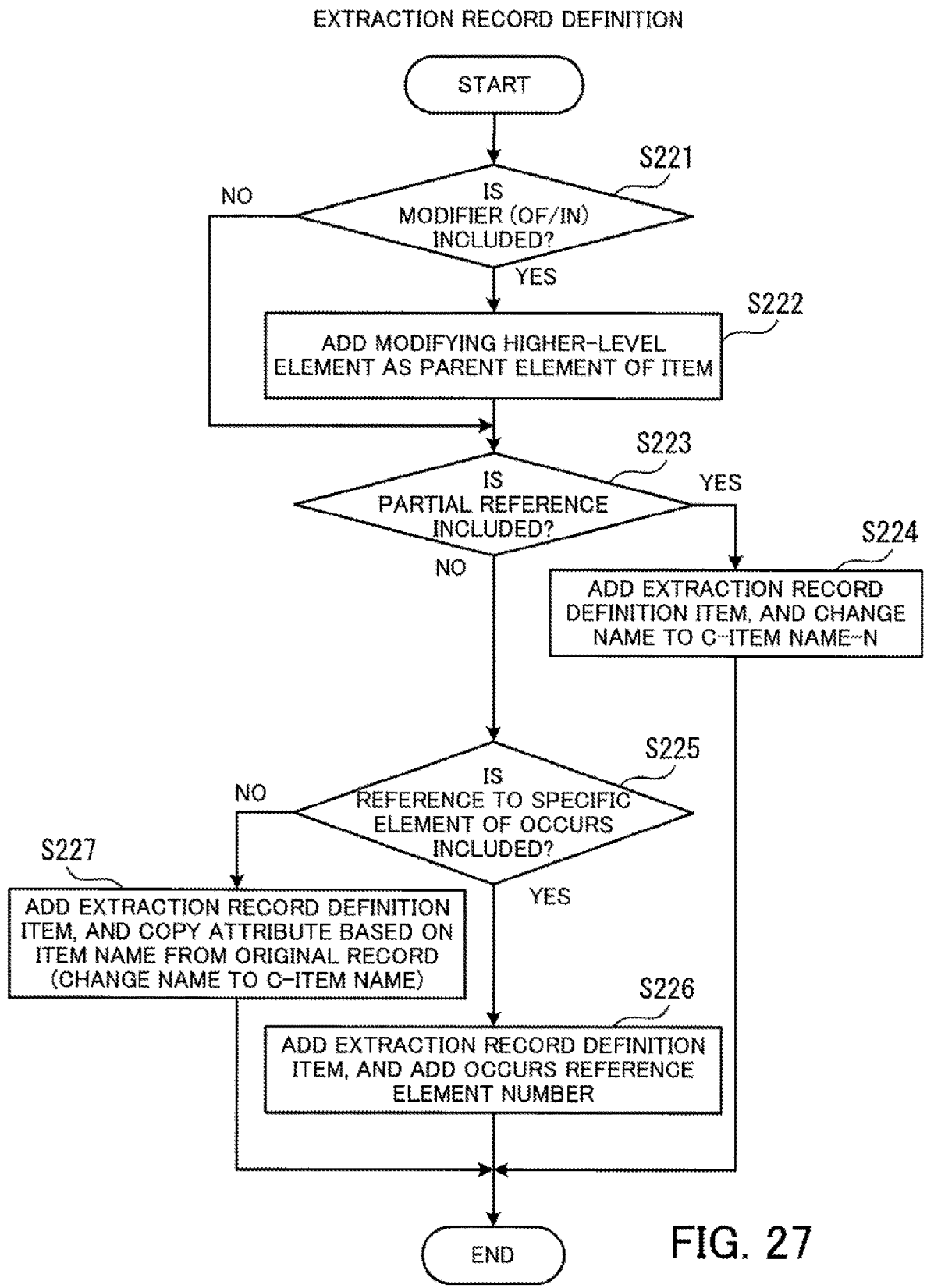
FIG. 27 is a flowchart illustrating an exemplary procedure of an extraction record definition process.

FIG. 27 is a flowchart illustrating an exemplary procedure of an extraction record definition process. In the following, the process illustrated in FIG. 27 will be described step by step.

(Step S221) The record conversion program generation unit 150 determines whether the item name under processing includes a modifier (OF or IN . . . ). If a modifier is included, the procedure proceeds to step S222. If a modifier is not included, the procedure proceeds to step S223.

(Step S222) The record conversion program generation unit 150 adds a higher-level element modifying the item name under processing as a parent element to the COBOL source file 67. In the example of FIG. 18, based on "YEAR OF SALES-DATE" that is the item name with the modifier added in the record reference information 84*a*, an extraction record definition "02 C-SALES-DATE" corresponding to the higher-level item "SALES-DATE" of the child element "YEAR" is added to the record conversion program 64.

(Step S223) The record conversion program generation unit 150 determines whether the item name under processing includes a description indicating partial reference. If a description indicating partial reference is included, the procedure proceeds to step S224. If a description indicating partial reference is not included, the procedure proceeds to step S225.

(Step S224) The record conversion program generation unit 150 adds the extraction record definition corresponding to the item name under processing to the COBOL source file 67. In this step, the item type that is specified in the extraction record definition is copied from the record definition. As for the item length, the item length included in the description of partial reference is copied. The name of the extraction record definition corresponding to the description of partial reference is "C-item name-N". Here, N is an integer greater than or equal to 1 for identifying the extraction record definition corresponding to the description of partial reference. In the example of FIG. 20, the record reference information 85*a* includes "DATA(1:5)" as an item name with a description of partial reference added. The description of partial reference in the item name "DATA(1:5)" is replaced by an identification number "1", so that an extraction record definition "02 C-DATA-1 PIC X5" is added to the record conversion program 65*a*. Then, the extraction record definition process with respect to the item name is completed.

(Step S225) The record conversion program generation unit 150 determines whether the item name under processing includes a description indicating reference to a specific element of OCCURS. If a description of reference to a specific element of OCCURS is included, the procedure proceeds to step S226. If a description of reference to a specific element of OCCURS is not included, the procedure proceeds to step S227.

(Step S226) The record conversion program generation unit 150 adds the extraction record definition corresponding to the item name under processing to the COBOL source file 67. In this step, the record conversion program generation unit 150 copies the attribute of the item name from the record definition, and adds information indicating the item name with a string "C-" prefixed thereto as an extraction record definition to the COBOL source file 67. Further, the record conversion program generation unit 150 adds an OCCURS reference element number to the end of the item name of the added extraction record definition. Then, the extraction record definition process with respect to the item name is completed. In the example of FIG. 22, based on the item name "TABLE(5)" in the record reference information 86*a*, an extraction record definition including the OCCURS reference element number "02 C-TABLE-5" is added to the record conversion program 66*a*.

Note that in the case where the item name under processing is the item name of a group item, the record conversion program generation unit 150 adds an extraction record definition corresponding to the child elements to the COBOL source file 67. In the example of FIG. 22, based on the item name "TABLE" of the group item, an extraction record definition corresponding to the child elements "DATE" and "INFO" is also added to the record conversion program 66*a*.

After the operation of step S226 is performed, the extraction record definition process for the item name under analysis is completed.

(Step S227) The record conversion program generation unit 150 adds the extraction record definition corresponding to the item name under processing to the COBOL source file 67. For example, the record conversion program generation unit 150 copies the attribute of the item name from the record definition, and adds information indicating the item name with a string "C-" prefixed thereto as an extraction record definition to the COBOL source file 67. In the example of FIG. 6, if the item name under processing is "ID", an extraction record definition "02 C-ID PIC X(3)" is added.

Further, if a modifier is added to the item name under processing, the item name with the modifier removed is included in the extraction record definition. In the example of FIG. 18, based on the item name "YEAR OF SALES-DATE" with the modifier added in the record reference information 84*a*, an extraction record definition "03 C-YEAR PIC 9(4)" using the item name "YEAR" with the modifier "OF SALES-DATE" removed is added to the record conversion program 64.

In this manner, the record conversion program is generated.

The dummy insertion program may be generated by performing operations similar to those performed in the record conversion program generation process. The dummy insertion program generation process differs from the record conversion program generation process in the operation of step S208. In the dummy insertion program generation process, a conversion MOVE statement "MOVE C-item name TO item name" is added.

By executing business processing in a distributed manner using the generated record conversion program and the dummy insertion program, the data transfer amount is reduced as illustrated in FIGS. 9 to 11. As a result, the efficiency of business processing is improved.

(c) Other Embodiments

In the second embodiment, the source file is written in COBOL code. However, the same processing may be applied to source files written in other languages. For example, consider the case of analyzing a CSV file in Java (registered trademark).

FIG. 28 illustrates an example of business processing for analyzing a CSV file. As illustrated in FIG. 28, even in the case of a CSV file, the data transfer amount may be reduced by not transmitting data that is not used in business processing (the first, second, fourth and sixth columns in the example).

In this case, a program that analyzes a CSV file and aggregates the sales is used as a business processing program.

FIG. 29 illustrates an example of a source file of a program that analyzes a CSV file. A source file 57 illustrated in FIG. 29 contains a business processing program written in Java (registered trademark) code. The procedure of extracting items to be referenced in the case of this type of source code will be described below.

First, the record conversion program generation unit 150 extracts a statement (instruction 1) that describes a process of reading an input file (input.csv), from the source file 57. Then, the record conversion program generation unit 150 stores a Reader variable (br) with which the input file is associated.

Subsequently, the record conversion program generation unit 150 extracts a statement (instruction 2) that describes a process (br.readLine) of reading data from the stored Reader, from the stored source file 57. Then, the record conversion program generation unit 150 stores the copy destination variable (line) in the extracted instruction.

Subsequently, the record conversion program generation unit 150 extracts a statement (instruction 3) that describes a process (line.split) of splitting the copy destination variable into CSV columns, from the source file 57. Then, the record conversion program generation unit 150 stores a storage destination variable (row) in that instruction.

After that, the record conversion program generation unit 150 extracts statements (instructions 4 and 5) each describing a process (row[ ]) that references the storage destination variable from the source file 57, and stores information indicating which column contains a record that is referenced. In this manner, the item that is referenced is specified.

Note that the source file 57 of FIG. 29 is merely an example, and there are other ways of writing each of the instructions 1 to 5. When analyzing the source file 57, the analysis may be performed taking into account of the way in which the instructions 1 to 5 are written.

By analyzing the source file 57 in the manner described above, it is possible to create a record conversion program and a dummy insertion program, based on a source file of business processing.

According to one aspect, it is possible to improve the data transfer efficiency without affecting business processing.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A distributed processing management method comprising:
   extracting, by a processor, a reference item name of a reference item that is referenced in processing from among a plurality of items of each of a plurality of records by analyzing a source file of a processing program describing the processing, the processing being performed on the plurality of records, the plurality of records being distributed and stored in a plurality of servers;
   generating, by the processor, a deletion program describing a process of deleting, from the records to be transmitted, data of a non-reference item that has an item name other than the reference item name;
   generating, by the processor, an insertion program describing a process of inserting, in each of the records with data of the non-reference item deleted therefrom, dummy data in a position where the data of the non-reference item was located; and
   causing, by the processor, the plurality of servers to execute the processing on the plurality of records in a distributed manner, based on the processing program, the causing including:
      before transmitting any of the plurality of records, causing the servers to delete data of the non-reference item from each of the records to be transmitted, according to the deletion program,
      causing the servers to transmit the plurality of records with the data of the non-reference item deleted therefrom via a network,
      causing the servers to receive the plurality of records with the data of the non-reference item deleted therefrom, each of the servers receiving a record transmitted from another server via the network, and
      causing the servers to insert the dummy data in a position in each of the received records where the data of the non-reference item was located, based on the insertion program, the received records into which the dummy data is inserted having a same data structure as the plurality of records before deletion of the data of the non-reference item,
   wherein:
   the extracting includes, when the source file specifies the reference item that is referenced in the processing from among a plurality of items that occur repeatedly with the reference item name in each of the plurality of records, by specifying an occurrence number indicating an order of the reference item among the plurality of items in each of the plurality of records, extracting the reference item name with the occurrence number of the reference item added thereto; and
   the generating the deletion program includes specifying, as a non-reference item, an item other than the item that occurs in an ordinal position indicated by the occurrence number from among the plurality of items that occur repeatedly with the reference item name.

2. The distributed processing management method according to claim 1, wherein the extracting includes, when the source file includes a group item name indicating an item group to which a plurality of items belong as an item name of an item that is referenced, extracting each of item names of the plurality of items as the reference item name.

3. The distributed processing management method according to claim 1, wherein:
   the extracting includes, when the source file includes the reference item name of the reference item and a group item name indicating an item group to which the reference item belongs, extracting the reference item name with the group item name added thereto; and
   the generating the deletion program includes specifying, as a non-reference item, an item not belonging to the item group having the group item name, from among items having the reference item name.

4. The distributed processing management method according to claim 1, wherein:
the extracting includes, when the source file includes a reference portion designation designating a portion of the reference item that is referenced, extracting the reference item name with the reference portion designation added thereto;
the generating the deletion program includes adding, to the deletion program, a description of a process of deleting a non-reference portion that is not designated by the reference portion designation from data of the reference item corresponding to the reference item name; and
the generating the insertion program includes adding a description of a process of inserting dummy data to the non-reference portion of the reference item.

5. The distributed processing management method according to claim 1, wherein the generating the deletion program includes adding a statement to the insertion program, the statement indicating copying values of the reference item included in the received records to the position of the reference item in each of records having the same data structure as the plurality of records before deletion of the data of the non-reference item.

6. A non-transitory computer-readable storage medium storing a computer program that causes a computer to perform a procedure comprising:
extracting a reference item name of a reference item that is referenced in processing from among a plurality of items of each of a plurality of records by analyzing a source file of a processing program describing the processing, the processing being performed on the plurality of records, the plurality of records being distributed and stored in a plurality of servers;
generating a deletion program describing a process of deleting, from the records to be transmitted, data of a non-reference item that has an item name other than the reference item name;
generating an insertion program describing a process of inserting, in each of the records with data of the non-reference item deleted therefrom, dummy data in a position where the data of the non-reference item was located; and
causing the plurality of servers to execute the processing on the plurality of records in a distributed manner, based on the processing program, the causing including:
before transmitting any of the plurality of records, causing the servers to delete data of the non-reference item from each of the records to be transmitted, according to the deletion program,
causing the servers to transmit the plurality of records with the data of the non-reference item deleted therefrom via a network,
causing the servers to receive the plurality of records with the data of the non-reference item deleted therefrom, each of the servers receiving a record transmitted from another server via the network, and
causing the servers to insert the dummy data in a position in each of the received records where the data of the non-reference item was located, based on the insertion program, the received records into which the dummy data is inserted having a same data structure as the plurality of records before deletion of the data of the non-reference item, wherein:
the extracting includes, when the source file specifies the reference item that is referenced in the processing from among a plurality of items that occur repeatedly with the reference item name in each of the plurality of records, by specifying an occurrence number indicating an order of the reference item among the plurality of items in each of the plurality of records, extracting the reference item name with the occurrence number of the reference item added thereto; and
the generating the deletion program includes specifying, as a non-reference item, an item other than the item that occurs in an ordinal position indicated by the occurrence number from among the plurality of items that occur repeatedly with the reference item name.

7. A distributed processing management apparatus comprising:
a memory; and
a processor connected to the memory and configured to perform a procedure including:
extracting a reference item name of a reference item that is referenced in processing from among a plurality of items of each of a plurality of records by analyzing a source file of a processing program describing the processing, the processing being performed on the plurality of records, the plurality of records being distributed and stored in a plurality of servers,
generating a deletion program describing a process of deleting, from the records to be transmitted, data of a non-reference item that has an item name other than the reference item name,
generating an insertion program describing a process of inserting, in each of the records with data of the non-reference item deleted therefrom, dummy data in a position where the data of the non-reference item was located, and
causing the plurality of servers to execute the processing on the plurality of records in a distributed manner, based on the processing program, the causing including:
before transmitting any of the plurality of records, causing the servers to delete data of the non-reference item from each of the records to be transmitted, according to the deletion program,
causing the servers to transmit the plurality of records with the data of the non-reference item deleted therefrom via a network,
causing the servers to receive the plurality of records with the data of the non-reference item deleted therefrom, each of the servers receiving a record transmitted from another server via the network, and
causing the servers to insert the dummy data in a position in each of the received records where the data of the non-reference item was located, based on the insertion program, the received records into which the dummy data is inserted having a same data structure as the plurality of records before deletion of the data of the non-reference item,
wherein:
the extracting includes, when the source file specifies the reference item that is referenced in the processing from among a plurality of items that occur repeatedly with the reference item name in each of the plurality of records, by specifying an occurrence number indicating an order of the reference item among the plurality of items in each of the plurality of records, extracting the reference item name with the occurrence number of the reference item added thereto; and the generating the deletion program includes specifying, as a non-reference item, an item other than the item that occurs in an ordinal position indicated by the occurrence number from among the plurality of items that occur repeatedly with the reference item name.

\* \* \* \* \*